(12) United States Patent
Abe et al.

(10) Patent No.: US 11,595,599 B2
(45) Date of Patent: *Feb. 28, 2023

(54) IMAGING DEVICE

(71) Applicant: Panasonic Intellectual Property Management Co., Ltd., Osaka (JP)

(72) Inventors: Yutaka Abe, Osaka (JP); Kazuko Nishimura, Kyoto (JP); Masashi Murakami, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,955

(22) Filed: Sep. 28, 2021

(65) Prior Publication Data
US 2022/0021824 A1 Jan. 20, 2022

Related U.S. Application Data

(63) Continuation of application No. 16/815,257, filed on Mar. 11, 2020, now Pat. No. 11,159,752.

(30) Foreign Application Priority Data

Mar. 20, 2019 (JP) .............................. JP2019-053883

(51) Int. Cl.
H04N 5/353 (2011.01)
H04N 5/363 (2011.01)
H04N 5/357 (2011.01)

(52) U.S. Cl.
CPC ............. *H04N 5/353* (2013.01); *H04N 5/357* (2013.01); *H04N 5/363* (2013.01)

(58) Field of Classification Search
CPC ........ H04N 5/353; H04N 5/363; H04N 5/357; H04N 5/3575; H04N 5/3745; H04N 5/238;
(Continued)

(56) References Cited

U.S. PATENT DOCUMENTS 9,257,468 B2 * 2/2016 Gomi ..................... H04N 5/363
9,392,193 B2 7/2016 Suzuki
(Continued)

FOREIGN PATENT DOCUMENTS

JP 2001-177084 A 6/2001
JP 2002-516530 A 6/2002
(Continued)

*Primary Examiner* — Pritham D Prabhakher
(74) *Attorney, Agent, or Firm* — McDermott Will & Emery LLP

(57) ABSTRACT

An imaging device includes a photoelectric converter that converts light into signal charge, a charge accumulation region that accumulates the signal charge, a first transistor having a gate connected to the charge accumulation region, and a common gate amplifier circuit that amplifies an output of the first transistor to output to the charge accumulation region. The common gate amplifier circuit includes a second transistor. One of a source and a drain of the second transistor is connected to one of a source and a drain of the first transistor, and the other of the source and the drain of the second transistor is connected to the charge accumulation region.

20 Claims, 14 Drawing Sheets

(58) Field of Classification Search
CPC .............. H04N 5/2353; H04N 5/359; H01L 27/14612; H01L 27/14603; H01L 27/14636; H01L 27/14609; H01L 27/14665; H01L 27/14643; H01L 27/14632; H01L 51/42
USPC ........................................................ 348/297
See application file for complete search history.

(56) References Cited

U.S. PATENT DOCUMENTS

| | | | |
|---|---|---|---|
| 9,583,521 B2* | 2/2017 | Otaka | H04N 5/3559 |
| 9,667,901 B2 | 5/2017 | Sakai et al. | |
| 9,888,197 B1 | 2/2018 | Hynecek et al. | |
| 9,936,150 B2* | 4/2018 | Hynecek | H04N 5/3559 |
| 9,991,298 B1 | 6/2018 | Mo et al. | |
| 10,868,051 B2* | 12/2020 | Hirase | H04N 5/37452 |
| 11,323,648 B2* | 5/2022 | Matsuura | H01L 27/14609 |
| 2008/0018761 A1 | 1/2008 | Kondo et al. | |
| 2011/0204977 A1 | 8/2011 | Kato et al. | |
| 2012/0188427 A1 | 7/2012 | Solhusvik | |
| 2013/0070133 A1* | 3/2013 | Takazawa | H04N 5/335 348/294 |
| 2013/0092820 A1* | 4/2013 | Takemoto | H04N 5/3742 250/208.1 |
| 2014/0139713 A1* | 5/2014 | Gomi | H04N 5/3698 348/308 |
| 2015/0015756 A1 | 1/2015 | Suzuki | |
| 2016/0006956 A1 | 1/2016 | Sakai et al. | |
| 2016/0006968 A1 | 1/2016 | Sakai et al. | |
| 2016/0049432 A1* | 2/2016 | Otaka | H04N 5/3559 348/308 |
| 2016/0150174 A1 | 5/2016 | Hynecek | |
| 2016/0190188 A1 | 6/2016 | Murakami et al. | |
| 2017/0208272 A1 | 7/2017 | Guidash et al. | |
| 2018/0315786 A1* | 11/2018 | Hirase | H01L 27/14609 |
| 2019/0313048 A1* | 10/2019 | Cheng | H04N 5/376 |
| 2020/0265909 A1* | 8/2020 | Matsuura | H04N 5/378 |

FOREIGN PATENT DOCUMENTS

| | | |
|---|---|---|
| JP | 2008-028516 A | 2/2008 |
| JP | 2010-129705 A | 6/2010 |
| JP | 2014-078870 A | 5/2014 |
| JP | 2015-186069 A | 10/2015 |
| JP | 2018-182709 A | 11/2018 |
| JP | 2018-191270 A | 11/2018 |
| WO | 1999/060777 A1 | 11/1999 |

* cited by examiner

IMAGING DEVICE

CROSS-REFERENCE OF RELATED APPLICATIONS

This application is a continuation under 35 U.S.C. § 111(a) of U.S. patent application Ser. No. 16/815,257, filed on Mar. 11, 2020, which in turn claims the benefit of Japanese Application No. 2019-053883, filed on Mar. 20, 2019, the entire disclosures of which Applications are incorporated by reference herein.

BACKGROUND

1. Technical Field

The present disclosure relates to an imaging device.

2. Description of the Related Art

In recent years, imaging devices have been widely used in a variety of fields, such as video cameras, digital still cameras, surveillance cameras, and in-vehicle cameras. Examples of an imaging device include a CCD (Charge Coupled Device) solid-state imaging device, a CMOS (Complementary Metal Oxide Semiconductor) solid-state imaging device, and the like.

Examples of an imaging device are described in Japanese Unexamined Patent Application Publication Nos. 2010-129705, 2008-28516, 2014-78870, and 2001-177084.

SUMMARY

One non-limiting and exemplary embodiment provides a technique suitable for noise suppression.

In one general aspect, the techniques disclosed here feature an imaging device including a photoelectric converter that converts light into signal charge, a charge accumulation region that accumulates the signal charge, a first transistor having a gate connected to the charge accumulation region, and a common gate amplifier circuit that amplifies an output of the first transistor to output to the charge accumulation region. The common gate amplifier circuit includes a second transistor. One of a source and a drain of the second transistor is connected to one of a source and a drain of the first transistor, and the other of the source and the drain of the second transistor is connected to the charge accumulation region.

The present disclosure provides a technique suitable for noise suppression.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

In recent years, a CMOS solid-state imaging device may have been used as an imaging device. The CMOS solid-state imaging device has the following advantages.

First, a CMOS solid-state image sensor can be manufactured by a general-purpose CMOS process. For this reason, existing facilities can be used for the manufacture of CMOS solid-state imaging devices. The availability of existing facilities is advantageous from a viewpoint of stable supply.

Secondly, in the CMOS solid-state imaging device, pixels and peripheral circuits can coexist in the same chip. For this reason, in a CMOS solid-state imaging device, signals can be read out at high speed. This enables a CMOS solid-state imaging device to achieve both high operation speed and high resolution at the same time.

In a CMOS solid-state imaging device, a CDS (Correlated Double Sampling) technique may be used. An example of the CDS technique is described in Japanese Unexamined Patent Application Publication No. 2010-129705. The CDS technique disclosed in Japanese Unexamined Patent Application Publication No. 2010-129705 is described below with reference to FIGS. 1 and 2.

Figure 1:
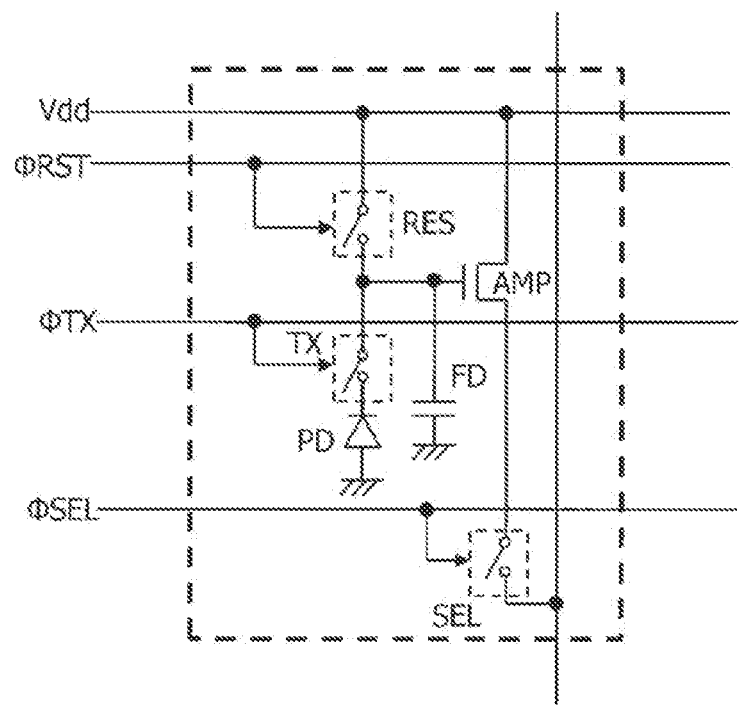
FIG. 1 is a schematic illustration of a pixel circuit of a typical imaging device.

FIG. 1 illustrates a pixel circuit described in Japanese Unexamined Patent Application Publication No. 2010-

129705. The pixel circuit includes a photodetector (PD) unit, a TX transistor, a floating diffusion (FD) region, an AMP transistor, a SEL transistor, and a RES transistor. In Japanese Unexamined Patent Application Publication No. 2010-129705, the PD unit is a photodiode.

The PD unit detects an optical signal and generates signal charge in accordance with the detected optical signal. The TX transistor transfers the signal charge from the PD unit to the FD region. The FD region temporarily holds the signal charge. The AMP transistor amplifies the signal voltage of the FD region in accordance with the amount of signal charge. The SEL transistor outputs an amplified signal voltage. The RES transistor resets the signal voltage of the FD region.

The TX transistor is controlled by a control signal φTX. The SEL transistor is controlled by a control signal φSEL. The RES transistor is controlled by a control signal φRST.

Figure 2:
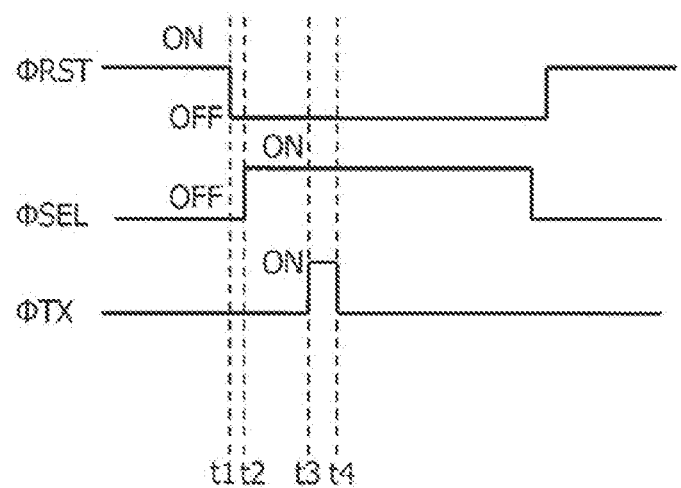
FIG. 2 is a timing diagram illustrating an example of the operation performed by the pixel circuit of a typical imaging device.

FIG. 2 is a timing diagram illustrating the operation performed by the pixel circuit illustrated in FIG. 1.

At time t1, φRST is set to a low level. As a result, the RES transistor is switched off.

Subsequently, at time t2, φSEL is set to a high level. As a result, the SEL transistor is switched on, and a reset voltage is output. Because the output reset voltage includes kTC noise, the reset voltage has temporal fluctuations based on the kTC noise. The kTC noise is also referred to as reset noise.

Subsequently, at time t3, φTX is set to a high level. As a result, the TX transistor is switched on. Thus, the signal charge accumulated in the PD unit is transferred to the FD region.

Subsequently, at time t4, φTX is set to a low level. Thus, the TX transistor is switched off. As a result, the signal voltage is determined.

The determined signal voltage is a voltage that has been changed by a voltage corresponding to the amount of accumulated signal charge with respect to the reset voltage. Therefore, by calculating the difference between the reset voltage and the signal voltage in a downstream circuit, the kTC noise can be canceled out, and only the signal voltage corresponding to the accumulated signal charge can be detected.

As described above, according to the CDS, kTC noise generated when the pixel unit is reset can be significantly reduced. A CMOS solid-state imaging device has an advantage that the CDS can be executed.

However, in the CDS technique described above, all the signal charge generated in the PD unit that detects the optical signal is transferred to the FD region. This transfer is referred to as "complete transfer". In general, an imaging device capable of achieving complete transfer requires a complicated manufacturing process and, thus, the manufacturing cost tends to increase.

In addition, recently, a solid-state imaging device having pixels capable of functioning as a global shutter has been developed. Such a solid-state imaging device can capture the images of an object operating at high speed without distortion. Japanese Unexamined Patent Application Publication No. 2008-28516 describes an example of such a solid-state imaging device.

In the solid-state imaging device described in Japanese Unexamined Patent Application Publication No. 2008-28516, the signal charges of the PD units of all the pixels are transferred to the FD region concurrently. Thereafter, the signal voltage is sequentially read for each of the rows. However, according to the CDS technique, the reset voltage is read before the signal voltage of the FD region is read. For this reason, it is difficult to apply the CDS technique to the solid-state imaging device described in Japanese Unexamined Patent Application Publication No. 2008-28516.

For this reason, when applying the technique for obtaining the difference between the reset voltage and the signal voltage to the solid-state imaging device described in Japanese Unexamined Patent Application Publication No. 2008-28516, the signal voltage of the FD region is read first. Thereafter, the FD region is reset to read the reset voltage. However, in such a case, there is no correlation between the reset noise included in the signal voltage and the reset noise included in the reset voltage. For this reason, it is difficult to remove the reset noise. As a result, in this case, random noise is likely to be greater than in reading using the CDS technique.

Recently, an organic CMOS sensor using an organic photoelectric conversion film in the PD unit has been developed. Japanese Unexamined Patent Application Publication No. 2014-78870 describes an example of an organic CMOS sensor. The organic CMOS sensor can solve the problem in that the sensitivity decreases with decreasing area of the PD unit due to a decrease in area per pixel with increasing number of pixels.

In a typical organic CMOS sensor, an organic photoelectric conversion film serving as a light receiving unit is provided above the readout circuit. In this way, even when the pixel size is reduced, the area of the light receiving unit can be increased and, thus, high sensitivity can be achieved.

A typical organic CMOS sensor has a stacked structure including a PD unit and a semiconductor layer. The PD unit and the semiconductor layer are electrically connected to each other by a metal wire. In the stacked structure, it is difficult to completely transfer signal charge. Accordingly, in a typical organic CMOS sensor, the PD unit and the FD region are electrically connected to each other, and the signal charge accumulated in the PD unit is read out. As a result, incomplete transfer noise and afterimages are less likely to occur.

In one particular example, signal charge is accumulated in the FD region during exposure, and the voltage of the FD region varies in accordance with the amount of the accumulated signal charge. The voltage of the FD region with the signal charge accumulated therein is read as a signal voltage. Subsequently, the FD region is reset, and the voltage of the FD region that has been reset is read as a reset voltage. Subsequently, the difference between the signal voltage and the reset voltage is acquired.

However, there is no correlation between the reset noise included in the signal voltage and the reset noise included in the reset voltage. For this reason, reset noise cannot be removed. For this reason, in the above-described particular example, random noise tends to be greater than in readout using the CDS technique.

As described above, the CDS technique is an effective technique for suppressing reset noise. However, the CDS technique makes the manufacturing process more complicated and, thus, increases the manufacturing cost. In addition, it is difficult to apply the CDS technique to an organic CMOS sensor.

As can be understood from the above description, a technique that can suppress noise without using the CDS technique is worth employing.

Outline of One Aspect of Present Disclosure

According to a first aspect of the present disclosure, an imaging device includes a photoelectric converter that converts light into signal charge, a charge accumulation region that accumulates the signal charge, a first transistor having a gate connected to the charge accumulation region, and a common gate amplifier circuit that amplifies an output of the first transistor to output the charge accumulation region.

The common gate amplifier circuit includes a second transistor. One of a source and a drain of the second transistor is connected to one of a source and a drain of the first transistor, and the other of the source and the drain of the second transistor is connected to the charge accumulation region.

The technique according to the first aspect is suitable for noise suppression. More specifically, according to the first aspect, noise can be suppressed without using the CDS technique.

According to a second aspect of the present disclosure, for example, in the imaging device according to the first aspect, the common gate amplifier circuit may have a voltage gain greater than 1 in a first period.

The common gate amplifier circuit according to the second aspect is an example of a common gate amplifier circuit.

According to a third aspect of the present disclosure, for example, in the imaging device according to the first aspect, the common gate amplifier circuit may have a voltage gain greater than 1 in a first period and may have a voltage gain greater than or equal to 0 and less than or equal to 1 in a second period.

The common gate amplifier circuit according to the third aspect is an example of a common gate amplifier circuit.

According to a fourth aspect of the present disclosure, for example, the imaging device according to any one of the first to third aspects may further include a first voltage supply circuit that is connected to the other of a source and a drain of the first transistor and that selectively outputs at least two types of different voltages, and a second voltage supply circuit that is connected to a gate of the second transistor and that selectively outputs at least three types of different voltages.

The fourth aspect is advantageous from a viewpoint of increasing the degree of freedom of control of the imaging device.

According to a fifth aspect of the present disclosure, for example, in the imaging device according to the fourth aspect, the at least three types of voltages output from the second voltage supply circuit may include a voltage that causes the second transistor to operate in a saturation region.

The fifth aspect is suitable for causing the common gate amplifier circuit to exert an effect of amplification.

According to a sixth aspect of the present disclosure, for example, the imaging device according to any one of the first to fifth aspects may further include a current supply unit including a first current supply and a second current supply.

The current supply unit selectively connects one of the first current supply and the second current supply to the one of the source and drain of the second transistor.

According to the sixth aspect, a common gate amplifier circuit can be achieved.

According to a seventh aspect of the present disclosure, for example, the imaging device according to any one of the first to fifth aspects may further include a current supply connected to a node between the one of the source and drain of the first transistor and the one of the source and drain of the second transistor without using a switching element between the current supply and the node.

According to the seventh aspect, high-speed noise cancellation is facilitated.

According to an eighth aspect of the present disclosure, for example, the imaging device according to any one of the first to third aspects may further include a first current supply configured to be connected to the one of the source and drain of the first transistor, and a second current supply configured to be connected to the other of the source and drain of the first transistor.

One of the first current supply and the second current supply may be electrically connected to the first transistor, and a direction of a current flowing in the first transistor when the first current supply is electrically connected to the first transistor may be the same as that when the second current supply is electrically connected to the first transistor.

According to the eighth aspect, a problem caused by a current flowing in the first transistor in the opposite direction can be avoided.

According to a ninth aspect of the present disclosure, for example, the imaging device according to any one of the first to third aspects may further include a differential amplifier circuit having a first input terminal, a second input terminal, and an output terminal, where the first input terminal is connected to the one of the source and drain of the first transistor and the output terminal is connected to the one of the source and drain of the second transistor, a first voltage supply circuit connected to the second input terminal, where the first voltage supply circuit selectively outputs at least two types of different voltages, and a second voltage supply circuit connected to a gate of the second transistor, where the second voltage supply circuit selectively outputs at least three types of different voltages.

According to the ninth aspect, a signal input to the differential amplifier circuit can be differentially amplified.

According to a tenth aspect of the present disclosure, for example, in the imaging device according to the ninth aspect, the at least three types of voltages output from the second voltage supply circuit may include a voltage that causes the second transistor to operate in a saturation region.

The tenth aspect is suitable for causing the common gate amplifier circuit to exert an effect of amplification.

According to an eleventh aspect of the present disclosure, for example, the imaging device according to any one of the first to tenth aspects may further include a first capacitor having a first terminal and a second terminal, where the first terminal is connected to the other of the source and drain of the second transistor, and a second capacitor having a third terminal and a fourth terminal, where the third terminal is connected to the charge accumulation region, and the fourth terminal is connected to the first terminal.

The eleventh aspect is suitable for suppressing reset noise.

According to a twelfth aspect of the present disclosure, for example, in the imaging device according to the eleventh aspect, the capacitance of the first capacitor may be larger than the capacitance of the second capacitor.

The twelfth aspect is suitable for suppressing reset noise.

According to a thirteenth aspect of the present disclosure, for example, the imaging device according to the eleventh or twelfth aspect may further include a third voltage supply circuit connected to the second terminal, where the third voltage supply circuit outputs a voltage that varies with time.

According to the thirteenth aspect, a common gate amplifier circuit can be achieved.

According to a fourteenth aspect of the present disclosure, for example, the imaging device according to any one of the eleventh to thirteenth aspects may include a third transistor having one of a source and a drain connected to the third terminal and the other of the source and the drain connected to the fourth terminal.

According to the fourteenth aspect, the potential of the charge accumulation region can be reset.

According to a fifteenth aspect of the present disclosure, for example, the imaging device according to any one of the first to twelfth aspects may further include a bias transistor having one of a source and a drain connected to the other of the source and drain of the second transistor, and a bias voltage supply connected to the other of the source and the drain of the bias transistor.

According to the fifteenth aspect, a common gate amplifier circuit can be achieved.

In the following embodiments, the terms "photoelectric converter" and "charge accumulation region" may be used. The photoelectric converter converts light into signal charge through photoelectric conversion. The charge accumulation region refers to a configuration in which signal charge contributing to the output of the first transistor is accumulated. The first transistor corresponds to an amplifier transistor 200 illustrated in, for example, FIG. 6. In the following embodiments, the charge accumulation region is also referred to as an "FD region".

As is described below, in an imaging device according to an example, the photoelectric converter includes an organic film and has a stacked structure including the photoelectric converter and the semiconductor layer. The photoelectric converter and the semiconductor layer are electrically connected to each other by a metal wire. In an imaging device having such a stacked structure, the term "charge accumulation region" may refer to the whole or substantially whole configuration that accumulates, therein, the signal charge generated through photoelectric conversion performed by the photoelectric converter.

In an imaging device according to another example, the photoelectric converter is a photodiode, and complete transfer of signal charge generated by the photoelectric converter is performed. The transfer destination is defined as a charge accumulation region. In such an imaging device, the term "charge accumulation region" may refer to part of a configuration that accumulates signal charge generated through photoelectric conversion performed by the photoelectric converter.

It is not always determined by the configuration of the photoelectric converter whether the charge accumulation region indicates the whole or part of the configuration that accumulates the signal charge generated through the photoelectric conversion by the photoelectric converter. Therefore, the definition of the charge accumulation region is not limited to the definition described above.

In the following embodiments, the statements like "the charge accumulation region (the FD region) is connected to an element X", "the charge accumulation region is connected to an element Y by an element X", and the like may be used. More specifically, in accordance with conventions, the above statements may be used in the following embodiments even in the case where the charge accumulation region includes any part or whole of the element X. For this reason, the above statements should be interpreted as statements including a case where the charge accumulation region includes any part or whole of the element X.

In the following embodiments, the charge accumulation region and other elements may be enumerated, such as "including a charge accumulation region and an element X". More specifically, in accordance with conventions, such enumeration may be made in description of the following embodiments even in the case where the charge accumulation region includes any part or whole of the element X. Even when such enumeration is made, it should be allowed that the charge storage unit includes any part or whole of the element X.

For example, in the following embodiments, a lower electrode 1b of a photoelectric converter 1 may be a part of the charge accumulation region. A wiring layer may be a part of the charge accumulation region. The gate of a amplifier transistor 200 may be a part of the charge accumulation region. A feedback capacitor 320 may be a part of the charge accumulation region.

In the following embodiments, description is made assuming that the signal charge generated by the photoelectric converter and accumulated in the charge accumulation region is a hole. However, the signal charge may be an electron. In this case, the term "hole" can be read as "electron".

In the following embodiments, the terms "common source amplifier circuit" and "common gate amplifier circuit" may be used. In the following embodiments, in accordance with conventions, the term "common source amplifier circuit" refers to a concept including not only an amplifier circuit having a source that is grounded but also an amplifier circuit having a source with a non-zero voltage applied thereto. Similarly, the term "common gate amplifier circuit" refers to a concept including not only an amplifier circuit having a gate that is grounded but also an amplifier circuit having a gate with a non-zero voltage applied thereto.

In the following embodiments, ordinal numbers (e.g., first, second, third, . . . ) may be used. When an ordinal number is attached to an element, it is not essential that an element of the same type that has a smaller ordinal number exists. The ordinal number can be changed as needed.

In the following embodiments, if the statement "a certain element is 'connected' to another element" is used, a third element may be interposed between these elements. In contrast, if the statement "a certain element is 'directly connected' to another element" is used, a third element is not interposed between these elements. In addition, if the statement "a certain element is 'electrically connected' to another element" is used, these elements need not always be electrically connected to each other. These elements are connected at least at a certain point in time.

Embodiments of the present disclosure are described below with reference to the accompanying drawings. While the present disclosure is described with reference to the following embodiment and the accompanying drawings, these are provided as illustrations and descriptions only, and are not intended to limit the present disclosure to the embodiments described. The disclosure described below can be changed as appropriate.

In addition, one embodiment can be combined with another embodiment. In the following description, the same or similar components are denoted by the same reference numerals. In addition, duplicate description may be avoided.

The structure of an imaging device 100 according to the present embodiment is described first with reference to FIGS. 3 to 5B.

Structure of Imaging Device 100

Figure 3:
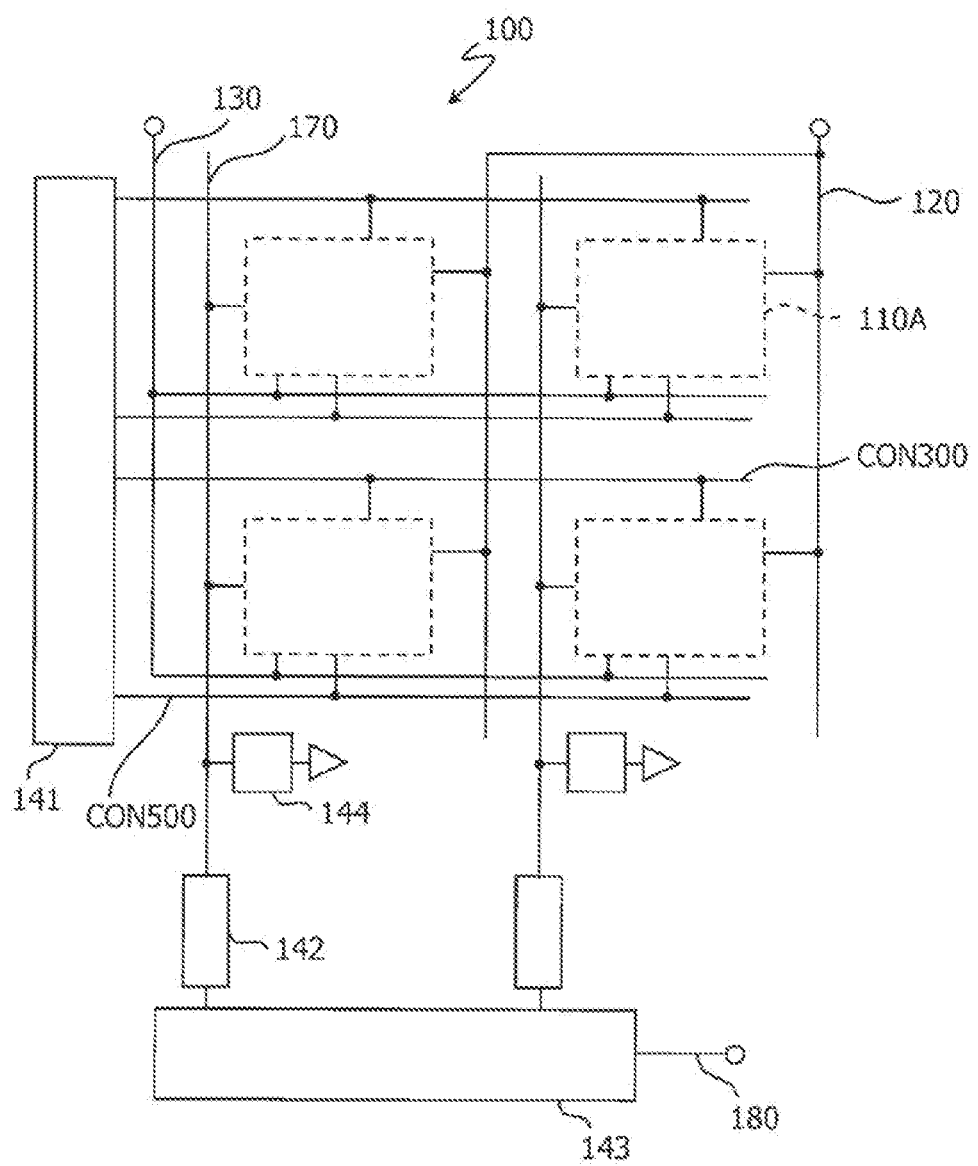
FIG. 3 is a schematic illustration of an exemplary circuit configuration of an imaging device according to an embodiment.

The structure of the imaging device 100 is described first with reference to FIG. 3.

FIG. 3 is a schematic illustration of an exemplary circuit configuration of the imaging device 100 according to the present embodiment. The imaging device 100 is, for example, a stacked imaging device having a photoelectric converter stacked on a semiconductor substrate. The imaging device 100 includes a plurality of pixels 110A and peripheral circuits.

The plurality of pixels 110A are arranged two-dimensionally so as to form a photosensitive region. The photosensitive region is also referred to as a "pixel region". The plurality of pixels 110A may be arranged one-dimensionally. In this case, the imaging device 100 may be a line sensor.

In the example illustrated in FIG. 3, the plurality of pixels 110A are arranged in the row direction and the column direction. In this way, the plurality of pixels 110A constitute a pixel array. As used herein, the row direction and the column direction refer to directions in which the rows and columns extend, respectively. The vertical direction is the column direction, and the horizontal direction is the row direction. In FIG. 3, the up-down direction is the column direction, and the right-left direction is the row direction.

Each of the pixels 110A is connected to power supply wiring 120. A predetermined power supply voltage is supplied to each of the pixels 110A via the power supply wiring 120. The imaging device 100 includes photoelectric converters that photoelectrically convert incident light. The same constant voltage is supplied to the entire photoelectric converters via an accumulation control line 130. However, when for example, control of reducing fluctuation is performed, the photoelectric converters may be divided into several regions, and different voltages may be supplied to the respective regions. The pixel 110A is described in more detail later. In the above-mentioned context of "voltage is supplied", the reference of "voltage" is typically the ground potential of the imaging device.

The peripheral circuits include a vertical scanning circuit 141, a column signal processing circuit 142, a horizontal signal readout circuit 143, and a current supply unit 144. The column signal processing circuit 142 and the current supply unit 144 can be arranged for each of the columns of the pixels 110A arranged two-dimensionally. Note that the vertical scanning circuit 141 is also referred to as a "row scanning circuit 141". The column signal processing circuit 142 is also referred to as a "row signal accumulation circuit 142". The horizontal signal readout circuit 143 is also referred to as a "column scanning circuit".

An example of the configuration of the peripheral circuits is described below.

The vertical scanning circuit 141 is connected to a selection control signal line CON500 and an amplification control signal line CON300. The vertical scanning circuit 141 selects the plurality of pixels 110A arranged in each row by applying a predetermined voltage to the selection control signal line CON500. In this manner, readout of the signal voltage of the selected pixel 110A and reset of a pixel electrode (described below) are performed. The selection control signal line CON500 is also referred to as an "address signal line CON500".

The pixels 110A arranged in each column are electrically connected to the column signal processing circuit 142 via the vertical signal line 170 corresponding to each column.

The column signal processing circuit 142 performs noise suppression processing, analog-digital conversion, and the like. The horizontal signal readout circuit 143 is electrically connected to the plurality of column signal processing circuits 142 each provided corresponding to one of the columns of the pixels 110A. The horizontal signal readout circuit 143 sequentially reads signals from the plurality of column signal processing circuits 142 and outputs the signals to a horizontal common signal line 180. Hereinafter, analog-digital conversion is also referred to as "AD conversion".

The structure of the pixel 110A is described in detail below with reference to FIGS. 4, 5A, and 5B.

Figure 4:
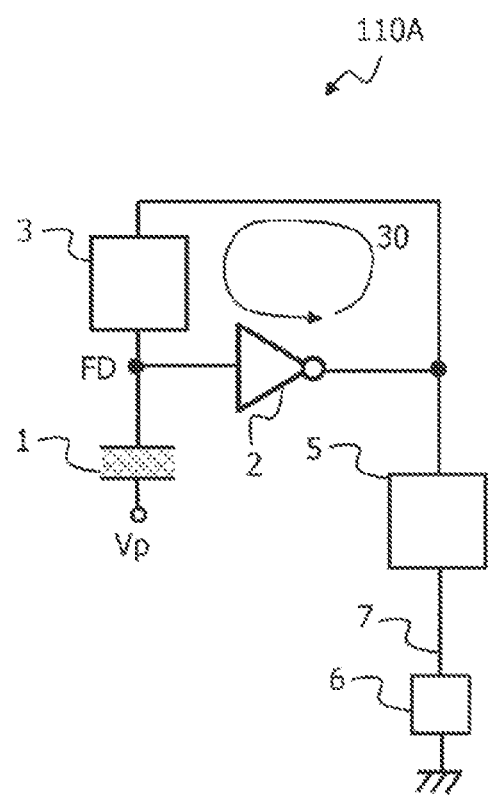
FIG. 4 is a schematic illustration of an exemplary circuit configuration of a pixel of the imaging device according to the embodiment.

FIG. 4 is a schematic illustration of an exemplary circuit configuration of the pixel 110A in the imaging device 100 according to the present embodiment. The pixel 110A includes a photoelectric converter 1, an amplifier unit 2, a feedback control unit 3, the FD region, and an output selection unit 5. The photoelectric converter 1 converts light into signal charge. The FD region accumulates the signal charge.

A readout circuit including the amplifier unit 2, the feedback control unit 3, the FD region, and the output selection unit 5 is formed. The photoelectric converter 1 converts light into signal charge. The readout circuit reads out the signal charge generated by the photoelectric converter 1.

Figure 5A:
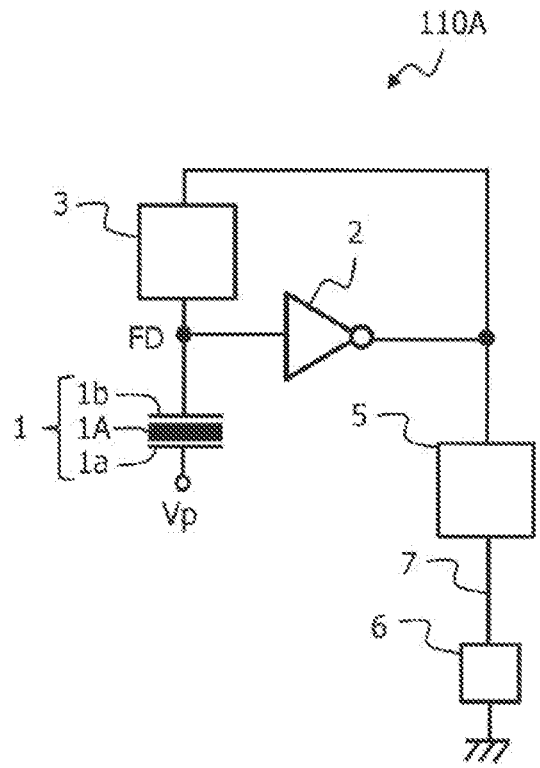
FIG. 5A is a schematic illustration of a configuration example of a photoelectric converter.
Figure 5B:
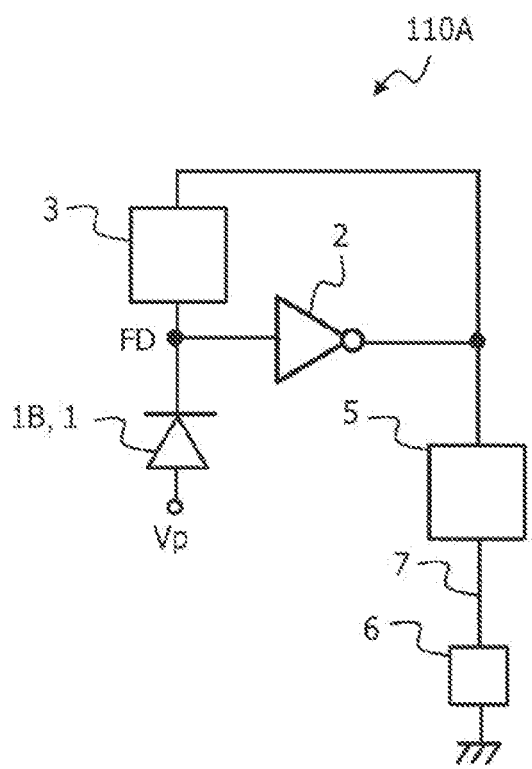
FIG. 5B is a schematic illustration of a configuration example of a photoelectric converter.

FIGS. 5A and 5B illustrate configuration examples of the photoelectric converter 1.

For example, as illustrated in FIG. 5A, the photoelectric converter 1 may include an upper electrode 1a, a lower electrode 1b, and an organic photoelectric conversion film 1A sandwiched therebetween. By applying a reference voltage Vp to the upper electrode 1a and connecting one end of the FD region to the lower electrode 1b, the signal charge generated by the photoelectric converter 1 is accumulated in the FD region. The lower electrode 1b is also referred to as a "pixel electrode". The upper electrode 1a is also referred to as a "counter electrode".

As illustrated in FIG. 5B, a photodiode 1B may be used as the photoelectric converter 1. By applying a ground voltage or the reference voltage Vp to one end of the photodiode 1B and connecting one end of the FD region to the other end of the photodiode 1B, the signal charge generated by the photoelectric converter 1 is accumulated in the FD region.

The photoelectric converter 1 may be another type of element having a photoelectric conversion function.

Referring back to FIG. 4, the FD region is connected to the photoelectric converter 1 by a wiring layer. The FD region accumulates the signal charge generated by the photoelectric converter 1. The FD region is further connected to the input of the amplifier unit 2. The amplifier unit 2 amplifies a signal corresponding to the signal charge accumulated in the FD region and outputs the amplified signal to the feedback control unit 3 and the output selection unit 5.

The amplifier unit 2 and the feedback control unit 3 form a circulation path 30 via the FD region. In the circulation path 30, the signal read from the FD region can be fed back to the FD region through the amplifier unit 2 and the feedback control unit 3. More specifically, in this feedback, the signal can be amplified by the amplifier unit 2 and the feedback control unit 3.

The output selection unit 5 is connected to a signal readout line 7. The signal readout line 7 is shared by at least two pixels. The signal amplified by the amplifier unit 2 is output to the signal readout line 7 via the output selection unit 5. The signal readout line 7 connects the output selection unit 5 to a current supply unit 6. The signal readout line 7 corresponds to the vertical signal line 170 illustrated in FIG. 3. The current supply unit 6 corresponds to the current supply unit 144 illustrated in FIG. 3.

First Embodiment

An imaging device according to the first embodiment has a plurality of pixels. Each of the pixels includes the photoelectric converter 1 that converts light into signal charge and a signal readout circuit that reads out the generated signal charge. As described below, according to the first embodiment, a variable voltage supply 330 is used. A specific example of the variable voltage supply is a RAMP power supply circuit. Although the details are described later, the variable voltage supply 330 is used to achieve a common gate amplifier circuit.

The signal readout circuit and a control circuit that controls the signal readout circuit according to the first embodiment are described in detail below with reference to FIG. 6.

The signal readout circuit according to the first embodiment includes a charge accumulation region, an amplifier transistor 200, a selection transistor 500, a feedback transistor 300, a reset transistor 400, a noise holding region, a signal intermediate region, a noise holding capacitor 310, and a feedback capacitor 320.

As described above, the charge accumulation region can be referred to as an FD region. In addition, the amplifier transistor 200 can be referred to as a first transistor 200. The feedback transistor 300 can be referred to as a second transistor 300. The reset transistor 400 can be referred to as a third transistor 400. The noise holding region can be referred to as an RD region. Alternatively, the noise holding region can be referred to as a branching region RD. The signal intermediate region can be referred to as an MD region. The noise holding capacitor 310 can be referred to as a first capacitor 310. The feedback capacitor 320 can be referred to as a second capacitor 320.

The FD region is connected to the photoelectric converter 1. The FD region accumulates signal charge generated through photoelectric conversion performed by the photoelectric converter 1. In addition, the FD region is connected to the gate of the amplifier transistor 200.

The drain or source of the amplifier transistor 200 is connected to the MD region. The MD region is connected to the drain or source of the feedback transistor 300. In addition, the MD region is connected to the source or drain of the selection transistor 500.

The selection transistor 500 selectively outputs the output of the amplifier transistor 200 to the outside of the pixel. The drain or source of the selection transistor 500 is connected to the signal readout line 7. The signal readout line 7 is shared by at least two pixels.

The RD region is connected to the source or drain of the feedback transistor 300. In addition, the RD region is connected to one end of the noise holding capacitor 310.

The variable voltage supply 330 is connected to the other end of the noise holding capacitor 310. The variable voltage supply 330 may be disposed inside the pixel or may be disposed outside the pixel. Placing the variable voltage supply 330 outside the pixel is advantageous from a viewpoint of reducing the area of the pixel. More specifically, according to the present embodiment, the variable voltage supply 330 is a RAMP power supply circuit.

The feedback capacitor 320 is inserted between the RD region and the FD region. In addition, the reset transistor 400 is inserted between the RD region and the FD region. The feedback capacitor 320 and the reset transistor 400 are arranged in parallel with each other between the RD region and the FD region.

Figure 6:
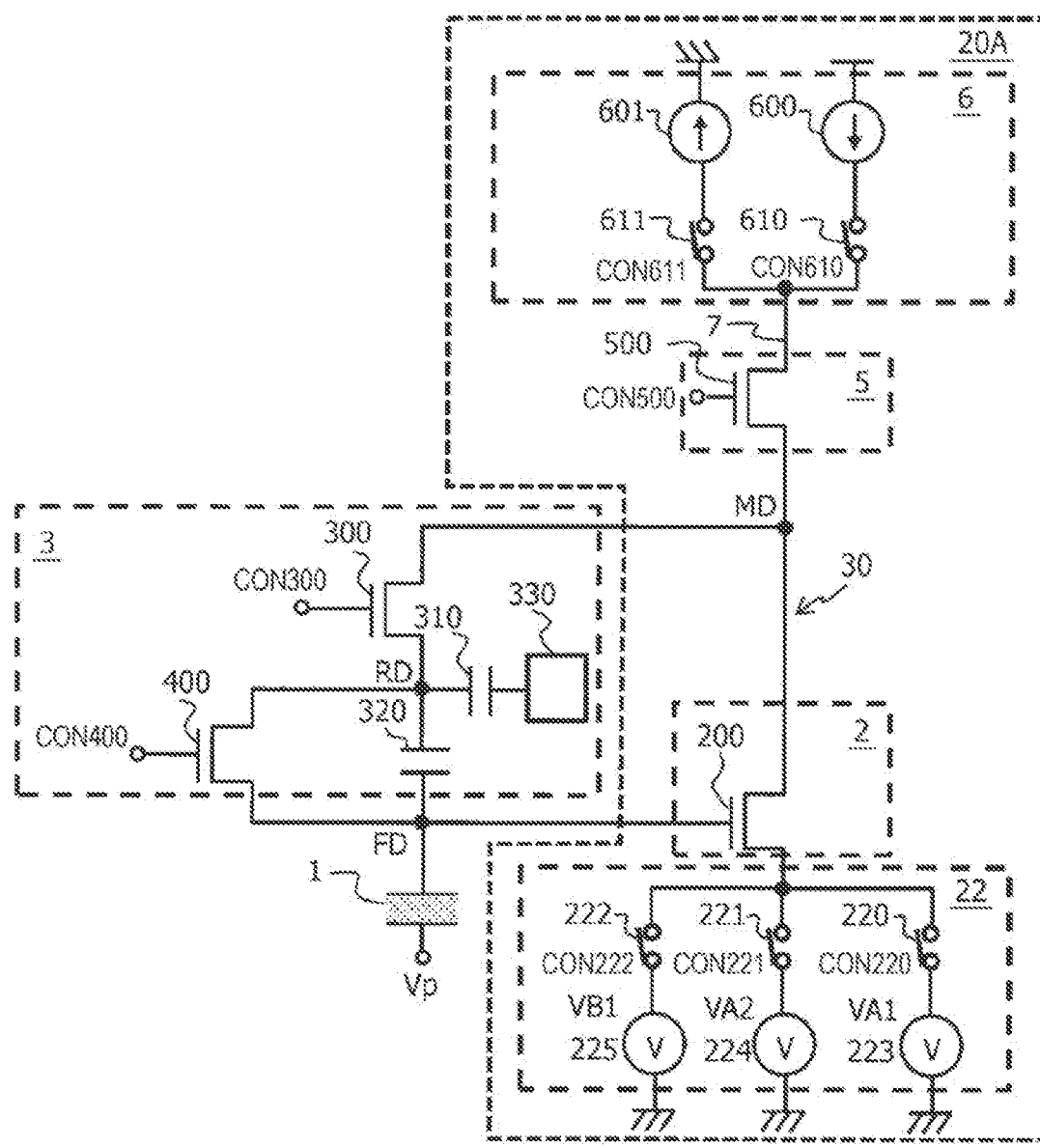
FIG. 6 is a schematic illustration of an exemplary circuit configuration of a readout circuit according to a first embodiment.

In the example illustrated in FIG. 6, the FD region, the amplifier transistor 200, the feedback transistor 300, and the FD region are connected to each other in this order. That is, in the example illustrated in FIG. 6, the circulation path 30 is provided. The circulation path 30 connects the FD region to the amplifier transistor 200, to the feedback transistor 300, and to the FD region.

More specifically, the FD region, the amplifier transistor 200, the feedback transistor 300, the feedback capacitor 320, and the FD region are connected to each other in this order. The circulation path 30 connects the FD region to the amplifier transistor 200, to the feedback transistor 300, to the feedback capacitor 320, and to the FD region.

Furthermore, the FD region, the amplifier transistor 200, the feedback transistor 300, the RD region, and the FD region are connected to each other in this order. The circulation path 30 connects the FD region to the amplifier transistor 200, to the feedback transistor 300, to the RD region, and to the FD region.

More specifically, the FD region, the amplifier transistor 200, the feedback transistor 300, the RD region, the feedback capacitor 320, and the FD region are connected to each other in this order. The circulation path 30 connects the FD region to the amplifier transistor 200, to the feedback transistor 300, to the RD region, to the feedback capacitor 320, and to the FD region.

The imaging device includes a common gate amplifier circuit. The common gate amplifier circuit amplifies the output of the amplifier transistor 200 and outputs the amplified output to the FD region. The common gate amplifier circuit includes the feedback transistor 300. One of the source and the drain of the feedback transistor 300 is connected to one of the source and the drain of the amplifier transistor 200. The other of the source and the drain of the feedback transistor 300 is connected to the FD region.

The common gate amplifier circuit may have a voltage gain greater than 1 in a first period. Alternatively, the common gate amplifier circuit may have a voltage gain greater than 1 in the first period and a voltage gain greater than or equal to 0 and less than or equal to 1 in a second period. The common gate amplifier circuit may be a non-inverting amplifier circuit.

Note that the statement "the imaging device includes a common gate amplifier circuit" should not be construed as only indicating that the common gate amplifier circuit performs its amplifying operation at all times. This statement should be construed to include a configuration in which the common gate amplifier circuit exerts an effect of amplification in one period and the common gate amplifier circuit does not exert an effect of amplification in another period. For this reason, the statement "the imaging device includes a common gate amplifier circuit" can be rephrased as "the operation mode of the imaging device includes a mode in which a common gate amplifier circuit that exerts an effect of amplification is achieved".

In the example illustrated in FIG. 6, the noise holding capacitor 310 has a first terminal and a second terminal. The first terminal is connected to the other of the source and the drain of the feedback transistor 300. The feedback capacitor 320 has a third terminal and a fourth terminal. The third terminal is connected to the FD region. The fourth terminal is connected to the first terminal. According to the present embodiment, the capacitance of the noise holding capacitor 310 is larger than the capacitance of the feedback capacitor 320. These features can contribute to suppression of reset noise.

Since the above-described connection is made in the imaging device, the signal of the FD region can be fed back. More specifically, the signal of the FD region can be fed back to the FD region through the amplifier transistor 200, the feedback transistor 300, and the feedback capacitor 320 in this order. More specifically, the feedback is a negative feedback.

The amplification control signal line CON300 is connected to the gate of the feedback transistor 300. The state of the feedback transistor 300 is determined by the potential of the amplification control signal line CON300. According to the present embodiment, the electric potential of the amplification control signal line CON300 is changed among at least three types of electric potentials.

According to the present embodiment, the imaging device includes a second voltage supply circuit that is connected to the gate of the feedback transistor 300 and that selectively outputs at least three different voltages. As can be understood from the above description, this output is performed via the amplification control signal line CON300. The at least three types of voltages supplied to the gate correspond to the at least three types of potentials applied to the amplification control signal line CON300, respectively. In the example illustrated in FIG. 3, the second voltage supply circuit is included in the vertical scanning circuit 141.

According to the present embodiment, the at least three types of potentials applied to the amplification control signal line CON300 include a potential that causes the feedback transistor 300 to operate in the saturation region. That is, at least three types of voltages output from the second voltage supply circuit include a voltage that causes the feedback transistor 300 to operate in the saturation region.

More specifically, according to the present embodiment, the at least three types of potentials applied to the amplification control signal line CON300 include a high level potential, a low level potential, and an intermediate potential. The high level potential is higher than the low level potential. The intermediate potential is higher than the low level potential and is lower than the high level potential. The at least three types of voltages supplied to the gate of the feedback transistor 300 include a high level voltage, a low level voltage, and an intermediate voltage. The high level voltage is higher than the low level voltage. The intermediate voltage is higher than the low level voltage and is lower than the high level voltage. The high level potential corresponds to the high level voltage. The low level potential corresponds to the low level voltage. The intermediate potential corresponds to the intermediate voltage.

For example, the feedback transistor 300 is off during a period in which the potential of the amplification control signal line CON300 is a low level potential. During the period, feedback of the signal of the FD region described above is not performed.

During a period in which the potential of the amplification control signal line CON300 is an intermediate potential, the feedback transistor 300 operates in the saturation region. During the period, a resistance component appears between the source and drain of the feedback transistor 300. This resistance component has an appropriate magnitude. For this reason, during the period, a potential difference can be generated between the RD region and the MD region while performing feedback of the signal of the FD region. As can be understood from the description below, in this situation, the common gate amplifier circuit can exert an effect of amplification.

During a period in which the potential of the amplification control signal line CON300 is a high level potential, the feedback transistor 300 is on. During the period, the feedback of the signal of the FD region described above is performed. However, during the period, since the feedback transistor 300 is on, the potentials of the RD region and the MD region are the same and, thus, the common gate amplifier circuit does not exert an effect of amplification.

The gate of the selection transistor 500 is connected to the selection control signal line CON500. The state of the selection transistor 500 is determined by the potential of the selection control signal line CON500.

According to the present embodiment, the potential of the selection control signal line CON500 can be set to a high level potential or a low level potential. The high level potential is higher than the low level potential. That is, a high level voltage or a low level voltage can be supplied to the gate of the selection transistor 500. The high level voltage is higher than the low level voltage. The high level potential corresponds to the high level voltage. The low level potential corresponds to the low level voltage.

For example, the selection transistor 500 is on during a period in which the potential of the selection control signal line CON500 is a high level potential. During the period, the amplifier transistor 200 and the signal readout line 7 are electrically connected to each other.

During a period in which the potential of the selection control signal line CON500 is a low level potential, the selection transistor 500 is off. During the period, the amplifier transistor 200 and the signal readout line 7 are electrically separated from each other.

According to the present embodiment, the imaging device includes a first voltage supply circuit that is connected to the other of the source and the drain of the amplifier transistor 200 and that selectively outputs at least two different types of voltages.

In the example illustrated in FIG. 6, a switching circuit 22 is connected to the source or drain of the amplifier transistor 200. The switching circuit 22 includes switch elements 220, 221 and 222 and voltage supplies 223, 224, and 225. In the example illustrated in FIG. 6, the first voltage supply circuit corresponds to the switching circuit 22.

The voltage supply 223 outputs a reference potential VA1. The voltage supply 224 outputs a reference potential VA2. The voltage supply 225 outputs a control potential VB1. The reference potential VA2 is higher than the reference potential VA1, and the control potential VB1 is higher than the reference potential VA2. That is, the magnitude relationship of VA1<VA2<VB1 is established. The reference potential VA1 is, for example, a ground potential GND. The control potential VB1 is, for example, a power supply potential VDD.

The voltage supply 223 can be connected to the source or drain of the amplifier transistor 200 via the switch element 220. The voltage supply 224 can be connected to the source or drain of the amplifier transistor 200 via the switch element 221. The voltage supply 225 can be connected to the source or drain of the amplifier transistor 200 via the switch element 222.

An element control signal line CON220 is connected to the switch element 220. An element control signal line CON221 is connected to the switch element 221. An element control signal line CON222 is connected to the switch element 222. According to the present embodiment, the imaging device switches on one selected from a plurality of switch elements (the three switch elements 220, 221, and 222 in the case of FIG. 6) and switches off the other switch elements by controlling the potentials of the plurality of switch element control signal lines (the three switch element control signal lines CON220, CON221, and CON222 in FIG. 6). In this manner, the potential of the source or drain of the amplifier transistor 200 is set to one of a plurality of potentials (three potentials VA1, VA2, and VB1 in the example illustrated in FIG. 6).

In one example, the switching circuit 22 is provided for each of the pixels. In another example, the switching circuit 22 is shared by a plurality of pixels. According to this example, the number of elements per pixel can be reduced.

In the example illustrated in FIG. 6, the current supply unit 6 is connected to the signal readout line 7. The current supply unit 6 includes switch elements 610 and 611 and current supplies 600 and 601. The current supply unit 6 selectively connects one of the first current supply 600 and the second current supply 601 to one of the source and the drain of the feedback transistor 300.

The current supply 600 generates a current that flows from the current supply 600 toward the signal readout line 7. The current supply 601 generates a current that flows from the signal readout line 7 toward the current supply 601.

The current supply 600 can be connected to the signal readout line 7 via a switch element 610. The current supply 601 can be connected to the signal readout line 7 via a switch element 611.

A switch element control signal line CON610 is connected to the switch element 610. A switch element control signal line CON611 is connected to the switch element 611. According to the present embodiment, the imaging device switches on one selected from the plurality of switch elements (the two switch elements 610 and 611 in the example illustrated in FIG. 6) and switches off the other switch elements by controlling the potentials of the plurality of switch element control signal lines (the two switch element control signal lines CON610 and CON611 in the example illustrated in FIG. 6). In this manner, one of the plurality of current supplies (the two current supplies 600 and 601 in the example illustrated in FIG. 6) can be selectively connected to the signal readout line 7.

The imaging device according to the present embodiment is provided with an amplifier circuit 20A. The amplifier circuit 20A includes the switching circuit 22, the amplifier transistor 200, the selection transistor 500, the signal readout line 7, and the current supply unit 6.

Control of the switch elements of the current supply unit 6 can be performed in conjunction with control of the switch elements of the switching circuit 22. For example, the control of the switch elements can be linked so that the following first connection state and second connection state are switched.

In the first connection state, among the plurality of switch elements 220, 221, and 222 of the switching circuit 22, the switch element 220 or 221 is on while the other switch elements are off. In addition, in the first connection state, the switch element 610 of the current supply unit 6 is on while the switch element 611 is off. Accordingly, in the first connection state, one of the voltage supplies 223 and 224 is connected to one of the source and drain of the amplifier transistor 200 and, thus, the potential of the source or drain of the amplifier transistor 200 is set to the potential VA1 or VA2. Consequently, the current supply 600 is connected to the signal readout line 7. According to the first connection state described above, the amplifier circuit 20A can be operated as a common source amplifier circuit having a high voltage amplification factor.

In the second connection state, among the plurality of switch elements 220, 221, and 222 of the switching circuit 22, the switch element 222 is on, and the other switch elements are off. In addition, in the second connection state, the switch element 611 of the current supply unit 6 is on, and the switch element 610 of the current supply unit 6 is off. Accordingly, in the second connection state, the voltage supply 225 is connected to the source or drain of the amplifier transistor 200 and, thus, the potential of the source or drain of the amplifier transistor 200 is set to the potential VB1. Consequently, the current supply 601 is connected to the signal readout line 7. According to the second connection state described above, the amplifier circuit 20A can be operated as a source follower circuit having a voltage amplification factor of approximately 1.

The example illustrated in FIG. 6 can be summarized as follows. In the imaging device according to this example, a first voltage supply source, a second voltage supply source, a first current supply source, and a second current supply source are provided. In the first connection state, the first current supply source, the amplifier transistor 200, and the first voltage supply source are connected to each other in this order. In addition, the first current supply source is disposed such that a current flows in a direction from the first current supply source to the first voltage supply source via the amplifier transistor 200. In the second connection state, the second voltage supply source, the amplifier transistor 200, and the second current supply source are connected to each other in this order. In addition, the second current supply source is disposed such that a current flows in a direction from the second voltage supply source to the second current supply source via the amplifier transistor 200.

In the example illustrated in FIG. 6, the current supply 600 corresponds to the first current supply source. The voltage supply 223 or 224 corresponds to the first voltage supply source. The current supply 601 corresponds to the second current supply source. The voltage supply 225 corresponds to the second voltage supply source.

In the first connection state, the amplifier circuit 20A can operate as a common source amplifier circuit. In the second connection state, the amplifier circuit 20A can operate as a source follower circuit. In this way, in the example illustrated in FIG. 6, the mode in which the amplifier circuit operates as a common source amplifier circuit and the mode in which the amplifier circuit operates as a source follower circuit can be switched. By switching between the modes, the voltage amplification factor of the amplifier circuit can be switched.

The reset transistor 400 resets the potential of the FD region. In the example illustrated in FIG. 6, one of the source and the drain of the reset transistor 400 is connected to the third terminal of the feedback capacitor 320. The other of the source and the drain of the reset transistor 400 is connected to the fourth terminal of the feedback capacitor 320.

A reset control signal line CON400 is connected to the gate of the reset transistor 400. The state of the reset transistor 400 is determined by the potential of the reset control signal line CON400.

According to the present embodiment, the potential of the reset control signal line CON400 can be set to a high level potential or a low level potential. The high level potential is higher than the low level potential. That is, a high level voltage or a low level voltage can be supplied to the gate of the reset transistor 400. The high level voltage is higher than the low level voltage. The high level potential corresponds to the high level voltage. The low level potential corresponds to the low level voltage.

For example, the reset transistor 400 is on during a period in which the potential of the reset control signal line CON400 is a high level potential. During the period, the RD region and the FD region are electrically connected to each other.

During a period in which the potential of the reset control signal line CON400 is a low level potential, the reset transistor 400 is off. During the period, the RD region and the FD region are connected to each other only by the feedback capacitor 320.

The transistor in the signal readout circuit according to the first embodiment is an NMOS transistor (n-channel metal-oxide-semiconductor transistor). However, the polarity of the transistor may be reversed. That is, the transistor in the signal readout circuit may be a PMOS transistor (p-channel metal-oxide-semiconductor transistor). It is obvious that the level of the control signal and the potential of the voltage supply are changed in accordance with the type of transistor, and the details thereof are not described here.

The correspondence relationship between the elements in FIG. 3 and the elements in FIG. 6 according to the present embodiment is described below. The accumulation control line 130 in FIG. 3 supplies the voltage Vp to the photoelectric converter 1 in FIG. 6. In FIG. 3, the reset control signal line CON400, the switching circuit 22, and the like are not illustrated. According to the present embodiment, the switching circuit 22 is located outside the pixel. More specifically, according to the present embodiment, like the current supply unit 6, the switching circuit 22 is provided for each of the columns of the pixel array formed by the pixels. One of the switching circuits 22 is connected to a plurality of pixels in the same column. However, the switching circuit 22 may be located inside a pixel.

The correspondence relationship between the elements in FIG. 4 and FIGS. 5A and 5B and the elements in FIG. 6 according to the present embodiment is described below. The amplifier unit 2 is an element including the amplifier transistor 200. The feedback control unit 3 is an element including the feedback transistor 300, the noise holding capacitor 310, the feedback capacitor 320, the variable voltage supply 330, and the reset transistor 400. The output selection unit 5 is an element including the selection transistor 500.

The first embodiment is effective for noise suppression. A specific example of the operation performed by the readout circuit according to the first embodiment is described below.

[0th Period] At time t1, the potential of the selection control line CON500 is switched from the low level to the high level. As a result, the selection transistor 500 is switched from off to on. In this manner, the amplifier transistor 200 and the signal readout line 7 are electrically connected to each other.

At time t1, the potentials of the amplification control signal line CON300 and the reset control signal line CON400 are switched from the low level to the high level. As a result, the feedback transistor 300 and the reset transistor 400 are switched from off to on.

At time t1, the switching circuit 22 and the current supply unit 6 are controlled. More specifically, the switch element 220 is controlled to be on, and the switch elements 221 and 222 are controlled to be off. As a result, the source or drain of the amplifier transistor 200 is connected to the voltage supply 223, and its potential becomes VA1. In addition, the switch element 610 is controlled to be on, and the switch element 611 is controlled to be off. As a result, the current supply 600 is connected to the signal readout line 7. By controlling the switching circuit 22 and the current supply unit 6 in this manner, a voltage is supplied from the voltage supply 223 to the FD region via the amplifier transistor 200, the MD region, the feedback transistor 300, and the reset transistor 400 in this order. As a result, the potential of the FD region is reset to a reset potential VRST.

Here, the gate-source voltage or the gate-drain voltage when the source-drain current flows in the amplifier transistor 200 is referred to as a voltage $V\alpha$. In addition, the state of the amplifier transistor 200 in which the gate-source voltage or the gate-drain voltage is the voltage $V\alpha$ and, thus, the source-drain current flows is referred to as a state in which the amplifier transistor 200 is operating at an operating point $OP\alpha$. At this time, it can be said that the reset potential VRST has a value that causes the amplifier transistor 200 to operate at the operating point $OP\alpha$. That is, the reset potential VRST is given by the following equation: $VRST=VA1+V\alpha$. In this context and related contexts, the gate-source voltage or the gate-drain voltage of the amplifier transistor 200 represents the potential difference between the gate voltage of the amplifier transistor 200 and one of the source and the drain of the amplifier transistor 200 to which a bias voltage is being applied. In the example illustrated in FIG. 6, the gate-source voltage or the gate-drain voltage of the amplifier transistor 200 represents the potential difference between the gate voltage of the amplifier transistor 200 and a connection portion of the amplifier transistor 200 and the switching circuit 22.

In the 0th Period, the output potential of the variable voltage supply 330 is fixed to a control potential VB10.

[1st Period] Subsequently, at time t2, the potentials of the amplification control line CON300 and the reset control line CON400 are switched from the high level to the low level. As a result, the feedback transistor 300 and the reset transistor 400 are switched from on to off. When the switching is performed, kTC noise generated by the reset in 0th Period still remains in the FD region.

Subsequently, at time t3, the switching circuit 22 is controlled. More specifically, the switch element 221 is controlled to be on, and the switch elements 220 and 222 are controlled to be off. As a result, the source or drain of the amplifier transistor 200 is connected to the voltage supply 224, and its potential becomes VA2. The potential VA2 is higher than the potential VA1. Accordingly, the gate-source voltage or the gate-drain voltage of the amplifier transistor 200 decreases, and the amplifier transistor 200 is in the off state or nearly off state. In addition, switching of the potential from VA1 to VB2 increases the potential of the MD region.

Thereafter, during the period from time t4 to time t5, the potential of the amplification control signal line CON300 is set to the control potential VB2 which is an intermediate potential between the high level and the low level. As a result, the feedback transistor 300 operates in the saturation region and enters a state in which a potential difference can be generated between the source and the drain while allowing the source-drain current to flow. Furthermore, the output potential of the variable voltage supply 330 gradually increases from a control potential VB11 to a control potential VB12. The control potential VB11 is the same potential as the control potential VB10 or a potential higher than the control potential VB10. The control potential VB12 is a potential higher than the control potential VB11.

According to the present embodiment, during the period from time t4 to time t5, the output potential is increased so that the elapsed time is proportional to an increment of the output potential of the variable voltage supply 330. That is, the output potential of the variable voltage supply 330 is increased linearly with the elapsed time. However, the output potential of the variable voltage supply 330 may be increased non-linearly with the elapsed time. For example, the output potential of the variable voltage supply 330 may be increased over time so that the output potential of the variable voltage supply 330 is a logarithmic function of the elapsed time.

The behavior of the imaging device during the period from time t4 to time t5 can be described as follows.

In the period from time t4 to time t5, the portion of the feedback transistor 300 that is electrically connected to the MD region is the source. For this reason, when the potential of the MD region is high, the feedback transistor 300 has a low gate-source voltage and, thus, is off. On the other hand, when the potential of the MD region is low, the feedback transistor 300 has a high gate-source voltage and, thus, is on. In addition, during this period, the amplifier circuit 20A operates as a common source amplifier circuit. For this reason, the amplifier transistor 200 operates as a transistor of a common source amplifier circuit and performs inverting amplification.

As described above, at time t3, the potential of the source or drain of the amplifier transistor 200 increases from VA1 to VA2, and the potential of the MD region is at a high level. For this reason, at the beginning of the period from time t4 to time t5, the potential of the MD region is high. For this reason, the feedback transistor 300 is off. In addition, due to the potential increase from VA1 to VA2 at time t3, the gate-source voltage or the gate-drain voltage of the amplifier transistor 200 decreases. For this reason, at the beginning of the period from time t4 to time t5, the amplifier transistor 200 has a low gate-source voltage or gate-drain voltage and is in the off state or nearly off state.

If the output potential of the variable voltage supply 330 increases during the period from time t4 to time t5, the potential of the RD region also increases so that the charge in the noise holding capacitor 310 is retained. In addition, the potential of the FD region increases with increasing potential of the RD region. If the potential of the FD region increases, the gate-source voltage or the gate-drain voltage of the amplifier transistor 200 increases so as to approach VRST−VA1=Vα. The increase in voltage together with the inverting amplification performed by the amplifier transistor 200 decrease the potential of the MD region. If the potential of the MD region decreases, the gate-source voltage of the feedback transistor 300 increases. Subsequently, at a certain point in time, a current starts flowing from the drain to the source (that is, from the RD region to the MD region) in the feedback transistor 300. If the current starts flowing, the effect of an increase in the output potential of the variable voltage supply 330 on an increase in the potential of the RD region is partially canceled out by this current. For this reason, the potential of the RD region increases moderately and, thus, the potential of the FD region increases moderately. If the gate-source voltage or the gate-drain voltage of the amplifier transistor 200 reaches Vα, the potential of the RD region becomes a constant value, and the potentials of the MD region and the FD region also become constant values.

When the potential of the RD region becomes a constant value, the gate-source voltage or the gate-drain voltage of the amplifier transistor 200 is Vα, which is the same as in the period prior to time t3. However, when the potential of the RD region becomes a constant value, the potential supplied from the switching circuit 22 to the amplifier transistor 200 is not VA1 but VA2. Consequently, the potential of the FD region when the potential of the RD region becomes the constant value is VA2+Vα (=VRST+(VA2−VA1)). Since VA2>VA1, this potential is higher than the value VRST used during the period prior to time t3. Since the potential of the FD region increases with increasing potential of the RD region, the potential of the RD region that has become a constant value is higher than the potential of the RD region as of time t2.

As described above, according to the present embodiment, the variety of potentials exhibit the above-described behaviors from when the amplifier transistor 200 operates at the operating point OPα while receiving the supply of the potential VA1 until when the amplifier transistor 200 operates at the operating point OPα while receiving the supply of the potential VA2. As a result, the potential of the RD region increases. It should be noted that the operating point of the amplifier transistor 200 that receives the supply of the potential VA1 is not necessarily required to strictly match the operating point of the amplifier transistor 200 that receives the supply of the potential VA2. The operations including the operation described above are merely an example and are not intended to limit the present disclosure. This also applies to the embodiments described below.

Note that the output potential of the variable voltage supply 330 changes during the period from time t4 to time t5. For this reason, electric charges are discharged from the noise holding capacitor 310. Due to the discharge of the electric charge, a current flows from the drain to the source of the feedback transistor 300. The amount of current is Cs×K, where Cs is a capacitance value of the noise holding capacitor 310, and K is the amount of change in the output potential per unit time of the variable voltage supply 330 (that is, the time rate of change in output potential).

As can be understood from the above description, a situation can be obtained in which the noise holding capacitor 310 and the variable voltage supply 330 operate as current supplies, and the potential of the RD region is higher than the potential of the MD region. In this situation, the feedback transistor 300, the noise holding capacitor 310, and the variable voltage supply 330 operate as a common gate amplifier circuit. For this reason, the signal of the MD region is transmitted to the RD region with an amplification factor B greater than 1. In addition, the amplifier circuit 20A operates as a common source amplifier circuit. Consequently, the signal of the FD region is amplified by a factor of −A×B×Cc/(Cc+Cfd) and is fed back to the FD region. Note that −A is the amplification factor of source grounded amplification. Cc is the capacitance value of the feedback capacitor 320, and Cfd is the capacitance value of the FD region.

To linearly increase the output potential of the variable voltage supply 330 with time during the period from time t4 to time t5, the current flowing through the feedback transistor 300 can be a constant current. However, as described above, the output potential of the variable voltage supply 330 may be increased non-linearly with time. In either case, the common gate amplifier circuit can exert an effect of amplification.

At time t5, the output of the variable voltage supply 330 is fixed to the control potential VB12. In addition, the potential of the amplification control signal line CON300 is switched from the high level to the low level.

Due to the feedback operation performed by the imaging device from time t4 to t5, the kTC noise remaining in the FD region at time t5 is suppressed to become a value obtained by multiplying the kTC noise remaining in the FD region at time t2 by $1/(1+A \times B \times Cc/(Cc+Cfd))$. In addition, due to the feedback operation, the thermal noise generated in the feedback transistor 300 is suppressed to become a value obtained by multiplying by $1/\sqrt{(1+A \times Cc/(Cc+Cfd))}$ and is further suppressed to become a value obtained by further multiplying by $Cc/(Cfd+Cc)$ when being transmitted to the FD region. Consequently, the thermal noise generated by the feedback transistor 300 and remaining in the FD region at time t5 is suppressed to $1/\sqrt{(1+A \times Cc/(Cc+Cfd))} \times Cc/(Cfd+Cc) \times \sqrt{(Cfd/Cs)}$ times the thermal noise remaining in the FD region at time t2.

[2nd Period] At time t6, the switching circuit 22 and the current supply unit 6 are controlled. More specifically, the switch element 222 is controlled to be on, and the switch elements 220 and 221 are controlled to be off. As a result, the source or drain of the amplifier transistor 200 is connected to the voltage supply 225, and its potential becomes VB1. In addition, the switch element 611 is controlled to be on, and the switch element 610 is controlled to be off. As a result, the current supply 601 is connected to the signal readout line 7. By controlling the switching circuit 22 and the current supply unit 6 in this manner, the amplifier circuit 20A operates as a source follower circuit.

At time t6, the voltage of the FD region changes from the reset voltage by a voltage corresponding to the amount of signal charge generated by the photoelectric converter 1 during the period from time t5 to time t6.

Subsequently, at time t7, a potential in accordance with the potential of the FD region is applied to the signal readout line 7. As described above, the amplification factor of the source follower circuit is about 1. For this reason, the signal voltage of the FD region is output to the signal readout line 7 with an amplification factor of about 1.

Here, the random noise is the fluctuation of the output when the signal charge generated by the photoelectric converter 1 is 0, that is, the square sum of the kTC noise and the thermal noise of the feedback transistor 300. In the "1st Period", the kTC noise is suppressed to become a value obtained by multiplying by $1/(1+A \times B \times Cc/(Cc+Cfd))$, and the thermal noise of the feedback transistor 300 is suppressed to become a value obtained by multiplying by $1/\sqrt{(1+A \times Cc/(Cc+Cfd))} \times Cc/(Cfd+Cc) \times \sqrt{(Cfd/Cs)}$. For example, if the amplification factor B is 100, Cc is 0.1 times Cfd, and Cs is 25 times Cfd, the kTC noise is suppressed to become 1/76 even when the amplification factor A is limited to 10. The thermal noise of the feedback transistor 300 is also suppressed to become 1/92 of the kTC noise at time t2. Thus, the signal charge generated by the photoelectric converter 1 can be read out with random noise suppressed greatly.

The imaging device according to this specific example operates as described above from the "0th Period" to the "2nd Period". In the circulation path 30, the common gate amplifier circuit can exert an effect of amplification. The amplification factor B of the common gate amplifier circuit is greater than 1. For this reason, according to the imaging device according to this specific example, the signal charge generated by the photoelectric converter 1 can be read out with random noise suppressed greatly. Thus, excellent image data with random noise suppressed can be acquired.

In the circulation path 30 according to the specific example, the common source amplifier circuit can also exert an effect of amplification. Note that the amplification factor A may be limited by a parasitic capacitance Cp between the FD region and the source or drain of the amplifier transistor 200. More specifically, the parasitic capacitance Cp can be generated by the layout, a device, and the like. However, even when the amplification factor A is limited, the random noise can be suppressed by using the common gate amplifier circuit.

Japanese Unexamined Patent Application Publication No. 2001-177084 describes a technique for removing reset noise without using the CDS technique. However, since the FD region is in a floating state, a parasitic capacitance Cp is generated between the FD region and the source or drain of the amplifier circuit at all times. The amplification factor does not increase to $(Cp+Cfd)/Cp$ or greater due to the influence of the parasitic capacitance Cp, no matter how much the amplification factor of the amplifier circuit is increased. Due to the structure of a MOS transistor, when Cp is, for example, 1/10 of Cfd, the amplification factor of the amplifier circuit is only −11, and a sufficient noise removal effect cannot be obtained. In contrast, according to the present embodiment, a higher amplification factor can be obtained. Note that above description relating to Japanese Unexamined Patent Application Publication No. 2001-177084 is not intended to limit the amplification factor obtained by the imaging device according to the present disclosure.

According to the first embodiment, a downstream circuit for detecting the signal on the signal readout line 7 can be employed. The column signal processing circuit 142 illustrated in FIG. 3 is an example of such a downstream circuit. The column signal processing circuit 142 AD-converts the signal on the signal readout line 7 for each of the columns.

In addition, according to the present embodiment, the column signal processing circuit 142 is provided for each of the columns. Each of the column signal processing circuits 142 performs noise suppression processing. In one specific example, the column signal processing circuit 142 acquires the signal voltage output to the signal readout line 7 at time t7. In addition, after the signal voltage is output to the signal readout line 7 at time t7, the operation described from the "0th Period" to the "1st Period" is performed again and, thereafter, the operation described in the "2nd Period" is performed before the photoelectric converter 1 performs light detection. In this manner, the reference voltage can be output to the signal readout line 7. The column signal processing circuit 142 acquires the reference voltage. The column signal processing circuit 142 obtains the difference between the acquired signal voltage and the reference voltage. In this way, the influence of the characteristic variation of the downstream circuit for each of the columns is canceled out. As a result, a signal having suppressed noise can be obtained.

According to the present embodiment, the column signal processing circuit 142 performs both AD conversion and noise suppression processing. However, the column signal processing circuit 142 may perform only one of AD conversion and noise suppression processing. For example, a configuration in which the column signal processing circuit 142 performs noise suppression processing and another element performs AD conversion may be employed. Alternatively, a configuration in which the column signal processing circuit 142 performs AD conversion and another element performs noise suppression processing may be employed. The column signal processing circuit 142 may be removed. The signal of the signal readout line 7 does not have to be AD-converted for each of the columns. The signal may be AD-converted for each of the pixels.

In the "2nd Period" according to the first embodiment, the signal of the FD region is read out while the amplifier circuit 20A is operating as a source follower circuit. For this reason, the voltage amplification factor in reading the signal is about 1. However, the reading technique is not limited thereto. The amplification factor can be appropriately changed in accordance with the required S/N, circuit range, and the like.

According to the first embodiment, in "0th Period", the reset voltage is supplied from the switching circuit 22 to the FD region via the amplifier transistor 200, the MD region, the RD region, and the reset transistor 400 in this order. However, the technique of supplying the reset voltage can be changed as appropriate.

Figure 7:
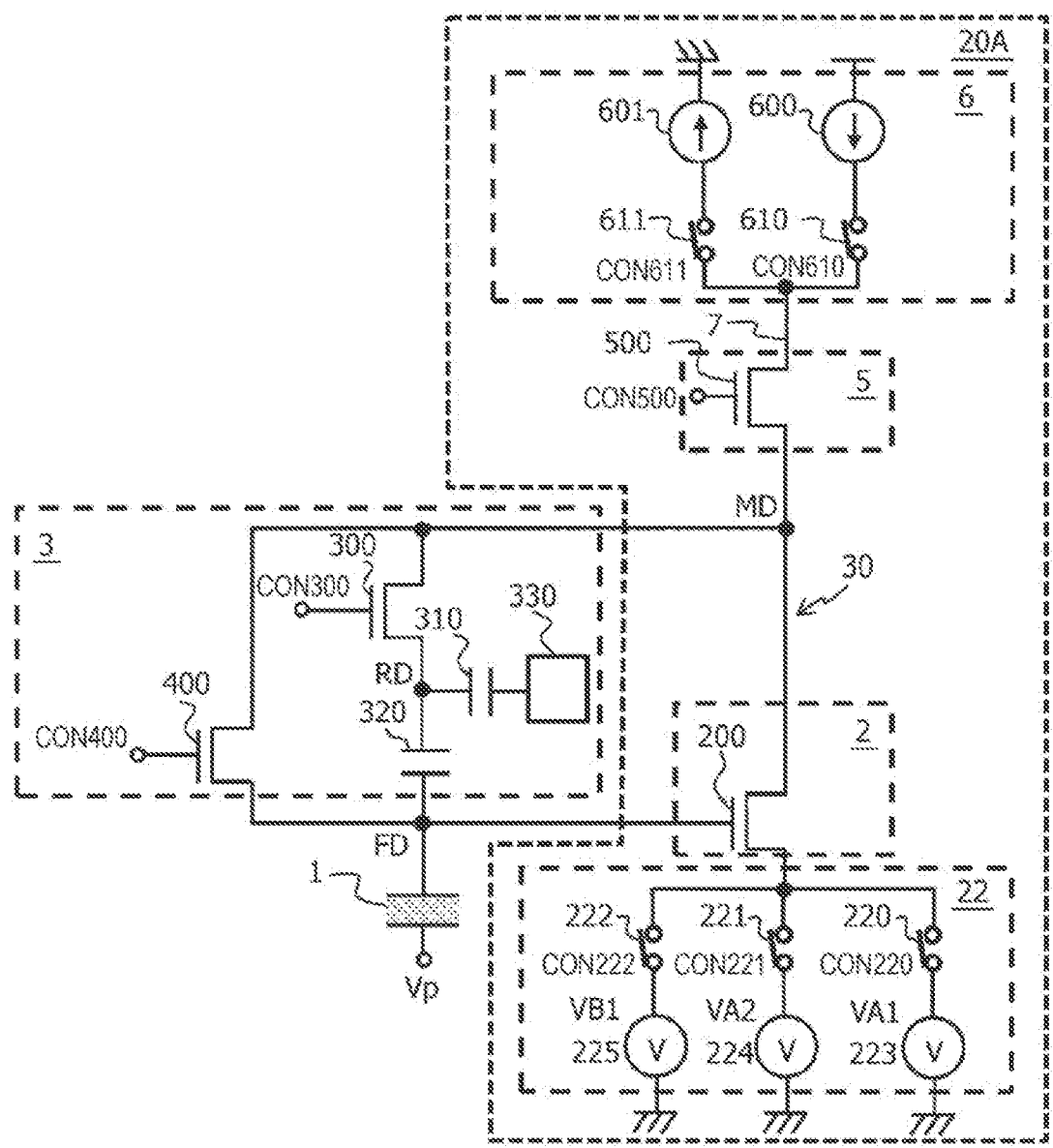
FIG. 7 is a schematic illustration of an exemplary circuit configuration of a readout circuit according to a modification.

For example, in supplying the reset voltage, it is not essential to go through the RD region. More specifically, in the example illustrated in FIG. 7, the reset voltage is supplied from the switching circuit 22 to the FD region via the amplifier transistor 200, the MD region, and the reset transistor 400 in this order.

Figure 8:
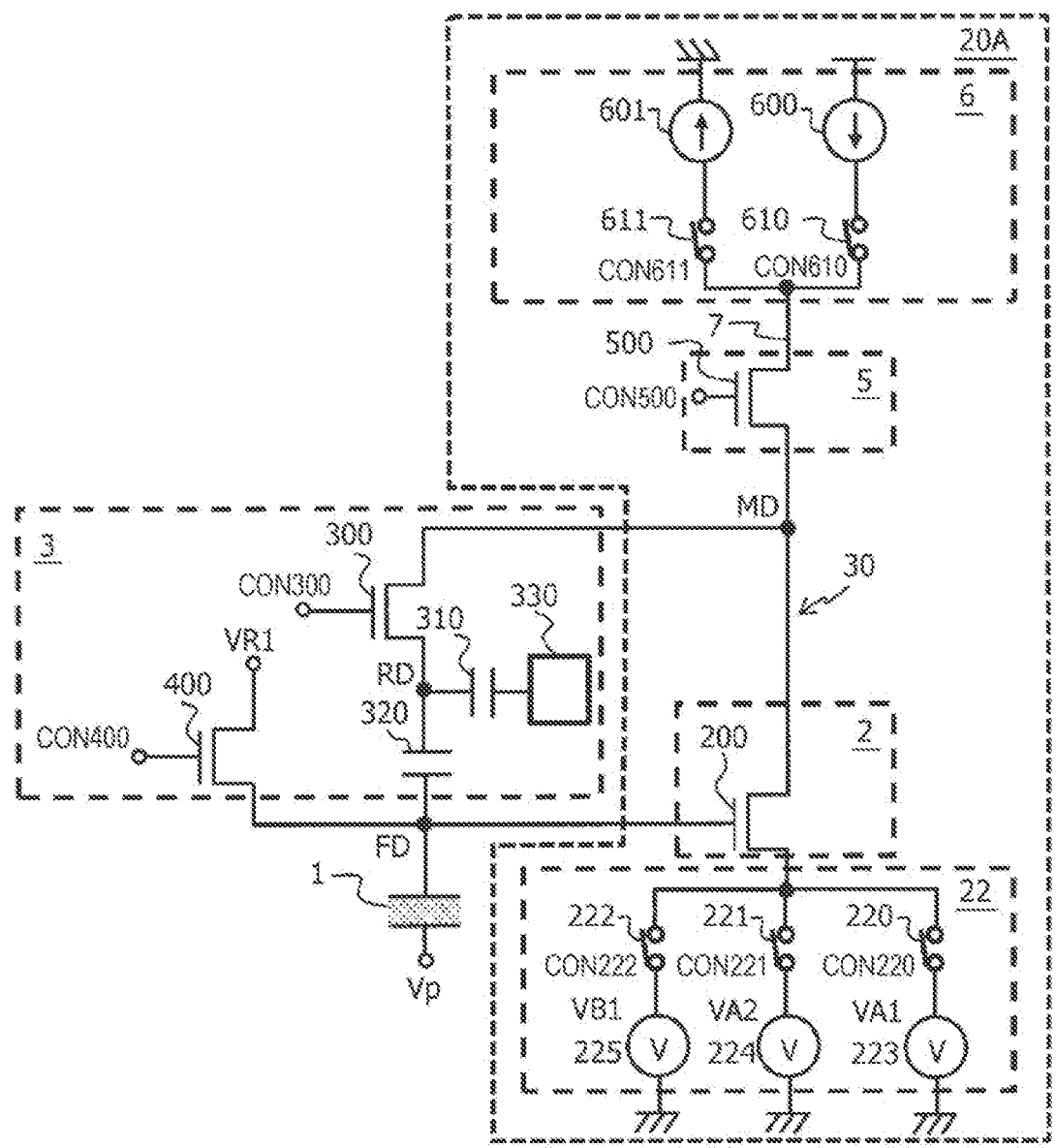
FIG. 8 is a schematic illustration of an exemplary circuit configuration of a readout circuit according to a modification.

Moreover, an example illustrated in FIG. 8 can be employed. In the example illustrated in FIG. 8, the reset voltage is supplied from a reference potential VR1 to the FD region via only the reset transistor 400. In this way, the FD region and the RD region can be reset to a constant potential independent of transistor variations. This is advantageous from a viewpoint of providing excellent image data regardless of device variations.

According to the first embodiment, the current supply 600 and the switching circuit 22 are located outside a pixel. However, this is not essential.

Figure 9:
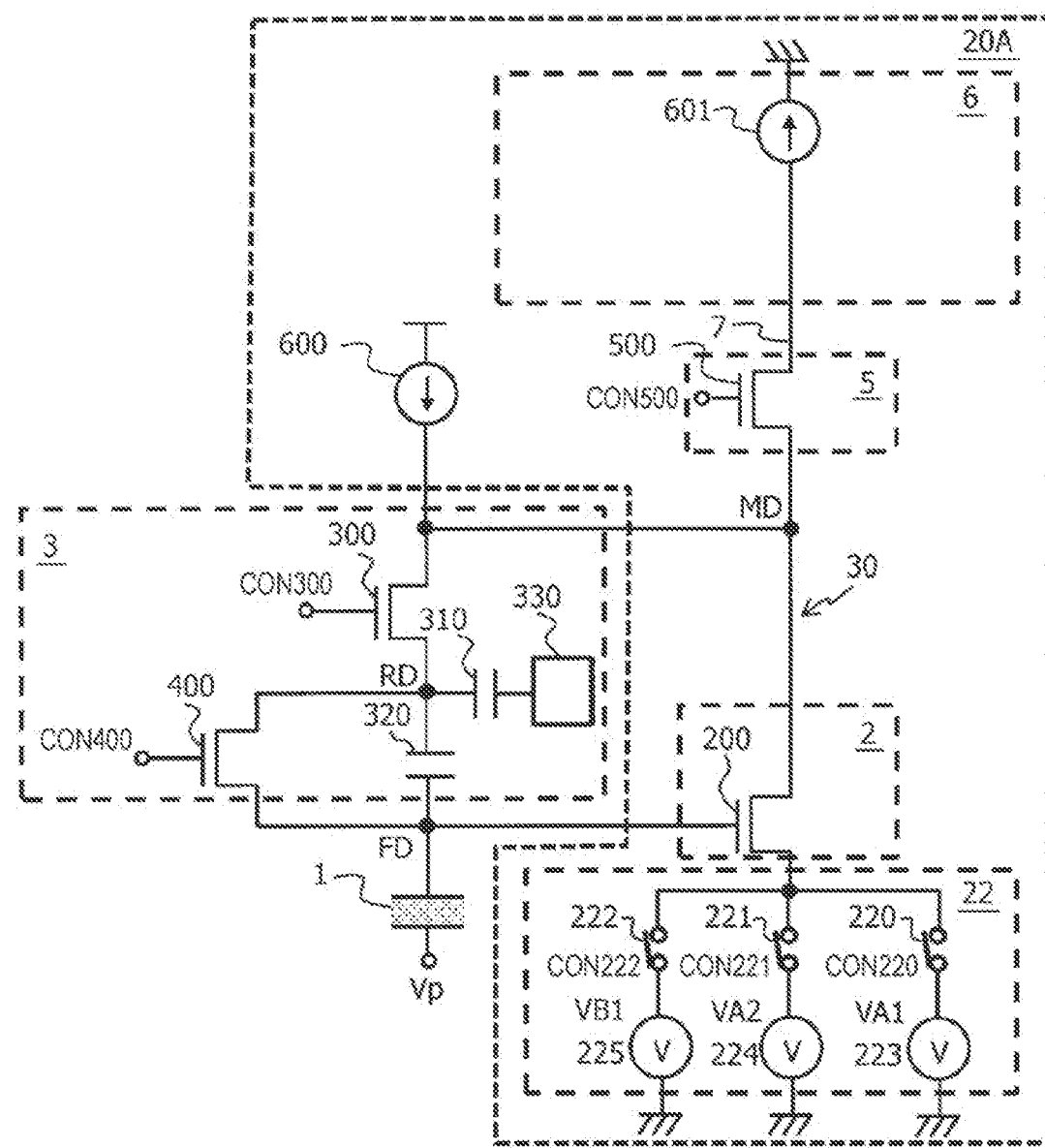
FIG. 9 is a schematic illustration of an exemplary circuit configuration of a readout circuit according to a modification.

In the example illustrated in FIG. 9, the imaging device includes the current supply 600 connected to a node between one of the source and drain of the amplifier transistor 200 and one of the source and drain of the feedback transistor 300 without using a switch element. More specifically, in the example illustrated in FIG. 9, the current supply 600 and the switching circuit 22 are located inside a pixel. According to the example illustrated in FIG. 9, the number of pixels that perform the noise canceling operation at the same time can be increased and, thus, the image data can be provided at a higher speed.

As described above, according to the first embodiment, the imaging device includes a third voltage supply circuit. The third voltage supply circuit is connected to the second terminal of the noise holding capacitor 310. The third voltage supply circuit outputs a voltage that changes over time. In the example illustrated in FIG. 6, the third voltage supply circuit corresponds to the variable voltage supply 330. In this manner, a common gate amplifier circuit is achieved, and the amplification effect thereof can be provided. Note that the common gate amplifier circuit can also be achieved in other ways.

Several other embodiments are described below. The same reference numbers are used in the embodiments described below for elements that are the same or similar to those elements described in the above embodiment, and descriptions of the elements are not necessarily repeated. The description relating to each of the embodiments applies to all the embodiments, unless there is technical contradiction. The embodiments may be combined with one another, unless there is technical contradiction.

Second Embodiment

Figure 10:
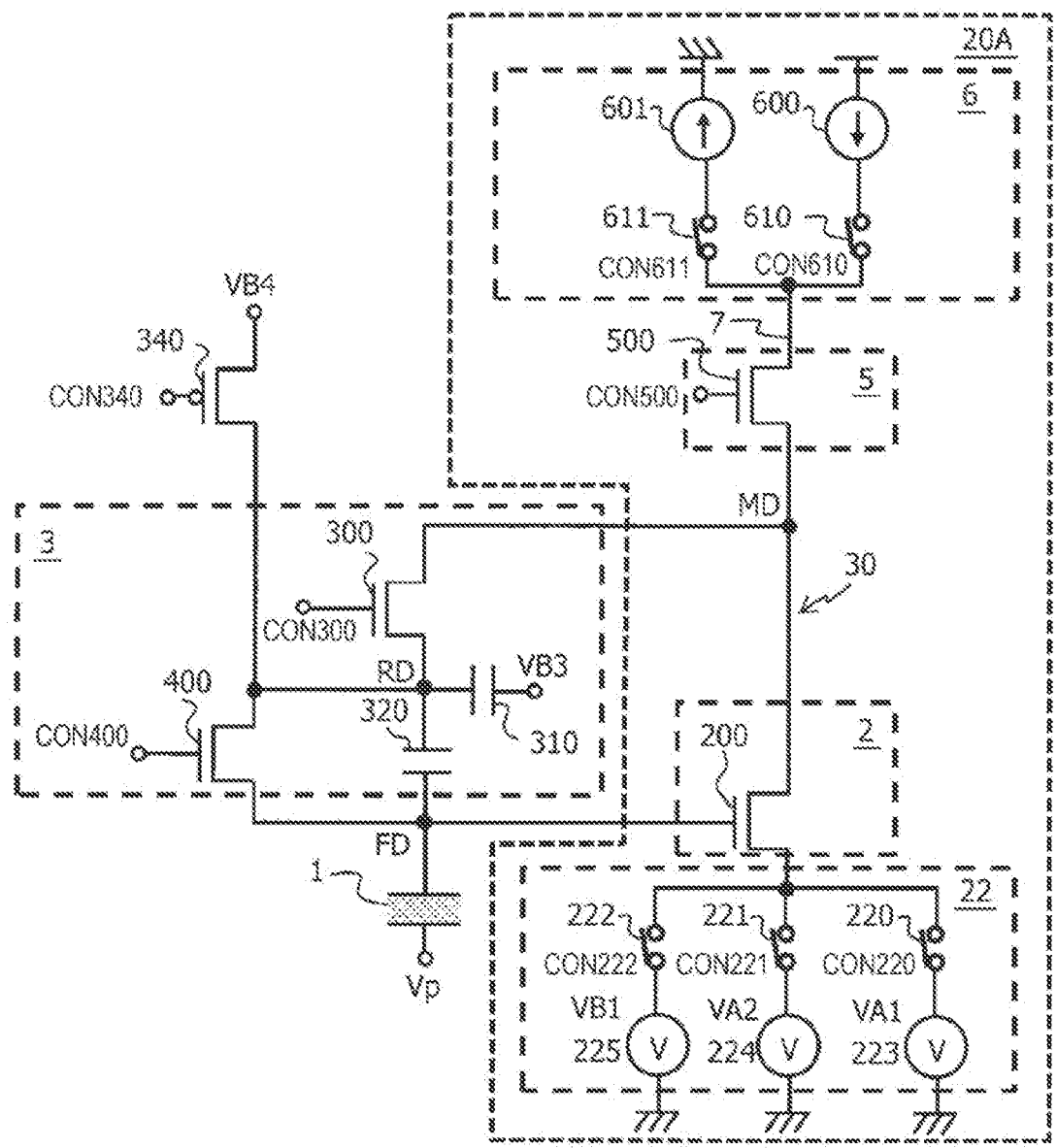
FIG. 10 is a schematic illustration of an exemplary circuit configuration of a readout circuit according to a second embodiment.

According to the second embodiment, to achieve the common gate amplifier circuit, a current supply transistor 340 is used. FIG. 10 illustrates a signal readout circuit according to the second embodiment.

According to the second embodiment, one end of the noise holding capacitor 310 is connected to the RD region. The other end of the noise holding capacitor 310 is connected to a reference potential VB3. The reference potential VB3 is, for example, the ground potential GND.

The imaging device according to the second embodiment includes the current supply transistor 340. One of the drain and source of the current supply transistor 340 is connected to the RD region. The other of the drain and the source of the current supply transistor 340 is connected to a reference potential VB4. The reference potential VB4 is, for example, the power supply potential VDD.

A current control signal line CON340 is connected to the gate of the current supply transistor 340. The state of the current supply transistor 340 is determined by the potential of the current control signal line CON340. According to the present embodiment, the potential of the current control signal line CON340 is changed among at least three types of potentials.

According to the present embodiment, the imaging device supplies at least three different voltages to the gate of the current supply transistor 340. As can be understood from the above description, the voltage is supplied via the current control signal line CON340. The at least three types of voltages supplied to the gate correspond to the at least three types of potentials applied to the current control signal line CON340.

More specifically, according to the present embodiment, the at least three types of potentials applied to the current control signal line CON340 include a high level potential, a low level potential, and an intermediate potential. The high level potential is higher than the low level potential. The intermediate potential is higher than the low level potential and lower than the high level potential. The at least three types of voltages supplied to the gate of the current supply transistor 340 include a high level voltage, a low level voltage, and an intermediate voltage. The high level voltage is higher than the low level voltage. The intermediate voltage is higher than the low level voltage and lower than the high level voltage. The high level potential corresponds to the high level voltage. The low level potential corresponds to the low level voltage. The intermediate potential corresponds to the intermediate voltage.

For example, the current supply transistor 340 is off during a period in which the potential of the current control signal line CON340 is a high level potential. During the period, no current flows through the current supply transistor 340.

During a period in which the potential of the current control signal line CON340 is a low level potential, the current supply transistor 340 is on. During the period, the reference potential VB4 and the RD region are electrically connected to each other, and the potential of the RD region becomes the reference potential VB4.

A constant current flows through the current supply transistor 340 during a period in which the potential of the current control signal line CON340 is fixed to the intermediate potential.

The second embodiment is effective for noise suppression. A specific example of the operation performed by the readout circuit according to the second embodiment is described below.

[10th Period] At time t11, the potential of the selection control line CON500 is switched from the low level to the high level. As a result, the selection transistor 500 is switched from off to on. As a result, the amplifier transistor 200 and the signal readout line 7 are electrically connected to each other.

At time t11, the potentials of the amplification control signal line CON300 and the reset control signal line CON400 are switched from the low level to the high level. As a result, the feedback transistor 300 and the reset transistor 400 are switched from off to on.

At time t11, the potential of the current control signal line CON340 is switched from the low level to the high level. As a result, the current supply transistor 340 is switched from on to off.

At time t11, the switching circuit 22 and the current supply unit 6 are controlled. More specifically, the switch element 220 is controlled to be on, and the switch elements 221 and 222 are controlled to be off. As a result, the source or drain of the amplifier transistor 200 is connected to the voltage supply 223, and its potential becomes VA1. In addition, the switch element 610 is controlled to be on, and the switch element 611 is controlled to be off. As a result, the current supply 600 is connected to the signal readout line 7. By controlling the switching circuit 22 and the current supply unit 6 in this way, a voltage is supplied from the voltage supply 223 to the FD region via the amplifier transistor 200, the MD region, the feedback transistor 300, and the reset transistor 400 in this order. As a result, the potential of the FD region is reset to the reset potential VRST.

In this specific example, the reset potential VRST has a value that causes the amplifier transistor 200 to operate at the operating point OPα. The reset potential VRST is given by the following equation: VRST=VA1+Vα.

[11th Period] Subsequently, at time t12, an operation the same as that at time t2 according to the first embodiment is performed.

Subsequently, at time t13, an operation the same as that at time t3 according to the first embodiment is performed.

Thereafter, during the period from time t14 to time t15, the potential of the amplification control signal line CON300 is set to the control potential VB2 that is an intermediate potential between the high level and the low level. As a result, the feedback transistor 300 operates in the saturation region and enters a state in which a potential difference can be generated between the source and the drain while allowing the source-drain current to flow.

According to the present embodiment, the potential of the current control signal line CON340 is fixed to the intermediate potential during the period from time t14 to time t15. As a result, the gate voltage of the current supply transistor 340 is fixed, and the current supply transistor 340 operates in a constant current supply mode. However, the potential of the amplification control signal line CON300 may be changed with time, and the gate voltage of the current supply transistor 340 may be changed with time. For example, the potential of the current control signal line CON340 may be gradually increased to the high level potential so that the output current of the current supply transistor 340 gradually decreases.

The behavior of the imaging device during the period from time t14 to time t15 can be described as follows.

During the period from time t14 to time t15, a portion of the feedback transistor 300 that is electrically connected to the MD region is the source. For this reason, when the potential of the MD region is high, the feedback transistor 300 has a low gate-source voltage and, thus, is off. In contrast, when the potential of the MD region is low, the feedback transistor 300 has a high gate-source voltage and, thus, is on. During the period, the amplifier circuit 20A operates as a common source amplifier circuit. For this reason, the amplifier transistor 200 operates as a transistor of the common source amplifier circuit and performs inverting amplification.

At time t13, the potential of the source or drain of the amplifier transistor 200 increases from VA1 to VA2, and the potential of the MD region is at the high level. For this reason, at the beginning of the period from time t14 to time t15, the potential of the MD region is high. For this reason, the feedback transistor 300 is off. In addition, due to the potential increase from VA1 to VA2 at time t13, the gate-source voltage or the gate-drain voltage of the amplifier transistor 200 decreases. For this reason, at the beginning of the period from time t14 to time t15, the amplifier transistor 200 has a low gate-source voltage or a low gate-drain voltage and is in the off state or nearly off state.

The charge supplied from the current supply transistor 340 is accumulated in the noise holding capacitor 310. Due to this accumulation, the potential of the RD region is increased, and the potential of the FD region is increased as the result of the increase in the potential of the RD region. If the potential of the FD region increases, the gate-source voltage or the gate-drain voltage of the amplifier transistor 200 increases so as to approach VRST−VA1=Vα. The increase in the voltage together with the inverting amplification performed by the amplifier transistor 200 decrease the potential of the MD region. If the potential of the MD region decreases, the gate-source voltage of the feedback transistor 300 increases. Thus, in the feedback transistor 300, at a certain point in time, a current starts flowing from the drain to the source (that is, from the RD region to the MD region). If the current starts flowing, the operation of the current supply transistor 340 to increase the potential of the RD region is partially canceled out by this current. For this reason, the potential of the RD region increases moderately and, thus, the potential of the FD region increases moderately. If the gate-source voltage or the gate-drain voltage of the amplifier transistor 200 reaches Vα, the potential of the RD region becomes a constant value, and the potentials of the MD region and the FD region also become constant values.

When the potential of the RD region becomes a constant value, the gate-source voltage or the gate-drain voltage of the amplifier transistor 200 is Vα, which is the same as the period prior to time t13. However, when the potential of the RD region becomes a constant value, the potential supplied from the switching circuit 22 to the amplifier transistor 200 is not VA1 but VA2. Accordingly, the potential of the FD region when the potential of the RD region becomes a constant value is VA2+Vα=VRST+(VA2−VA1). Since VA2>VA1, the potential is higher than the value VRST used during the period prior to time t3. Since the potential of the FD region increases with increasing potential of the RD region, the potential of the RD region, which has become a constant value, is higher than the potential of the RD region as of time t12.

When the potential of the RD region becomes the constant value, the current supplied from the current supply transistor 340 to the feedback transistor 300 is the same as the current flowing from the drain to the source of the feedback transistor 300.

As can be understood from the above description, a situation is obtained in which the current supply transistor 340 operates as a current supply and the potential of the RD region is higher than the potential of the MD region. In this situation, the feedback transistor 300, the noise holding capacitor 310, and the current supply transistor 340 operate as a common gate amplifier circuit. For this reason, the signal of the MD region is transmitted to the RD region with an amplification factor B greater than 1. In contrast, the amplifier circuit 20A operates as a common source amplifier circuit. Therefore, the signal of the FD region is amplified by a factor of $-A \times B \times Cc/(Cc+Cfd)$ and is fed back to the FD region.

At time t15, the potential of the current control signal line CON340 is switched from the intermediate potential to the high level potential. Accordingly, the current supply transistor 340 is switched off. In addition, the potential of the amplification control signal line CON300 is switched from the high level to the low level.

Due to the feedback operation performed by the imaging device from time t14 to t15, the kTC noise remaining in the FD region at time t15 is suppressed to become a value obtained by multiplying the kTC noise remaining in the FD region at time t12 by $1/(1+A \times B \times Cc/(Cc+Cfd))$. Furthermore, due to the feedback operation, the thermal noise generated in the feedback transistor 300 is suppressed to become a value obtained by multiplying by $1/\sqrt{(1+A \times Cc/(Cc+Cfd))}$. The thermal noise is further suppressed to become a value obtained by further multiplying by $Cc/(Cfd+Cc)$ when being transmitted to the FD region. As a result, the thermal noise generated by the feedback transistor 300 and remaining in the FD region at time t15 is suppressed to $1/\sqrt{(1+A \times Cc/(Cc+Cfd))} \times Cc/(Cfd+Cc) \times \sqrt{(Cfd/Cs)}$ times the thermal noise remaining in the FD region at time t12.

[12th Period] Subsequently, at time t16, the same operation as that at time t6 according to the first embodiment is performed.

Subsequently, at time t17, the same operation as that at time t7 according to the first embodiment is performed.

As can be understood from the above description, according to the second embodiment, one of the source and the drain of the current supply transistor 340 is connected to the other of the source and the drain of the feedback transistor 300. Even in this case, a common gate amplifier circuit can be achieved, and the amplifying operation can be provided. Note that the current supply transistor 340 is also referred to as a third transistor 340.

According to the second embodiment, the second terminal of the noise holding capacitor 310 is connected to a potential supply source. The potential supply source supplies a certain potential to the noise holding capacitor 310. This configuration is suitable for obtaining a situation in which electric charge can be accumulated in the noise holding capacitor 310. In a typical example, the potential supply source is a DC potential supply source that supplies a DC potential to the noise holding capacitor 310. The DC potential may be a fixed potential, such as a ground potential. However, the direct current potential may be an unfixed potential, and the magnitude of the DC potential during a certain period may differ from that during another period. The potential supply source may be a fixed potential unit having a fixed potential, such as a ground potential. In the example illustrated in FIG. 10, the potential supply source is an element that supplies the reference potential VB3. Such a potential supply source can be appropriately set in the imaging device. These descriptions similarly apply to a third embodiment described below.

According to the second embodiment, the current supply is formed with a transistor. For this reason, the intermediate potential of the current control signal line CON340 can be generated on the basis of the current output from a bandgap reference circuit. In this way, a constant current that is insusceptible to the temperature, element variation, and the like can be provided. This makes it possible to acquire excellent image data having stably suppressed random noise.

Third Embodiment

Figure 11:
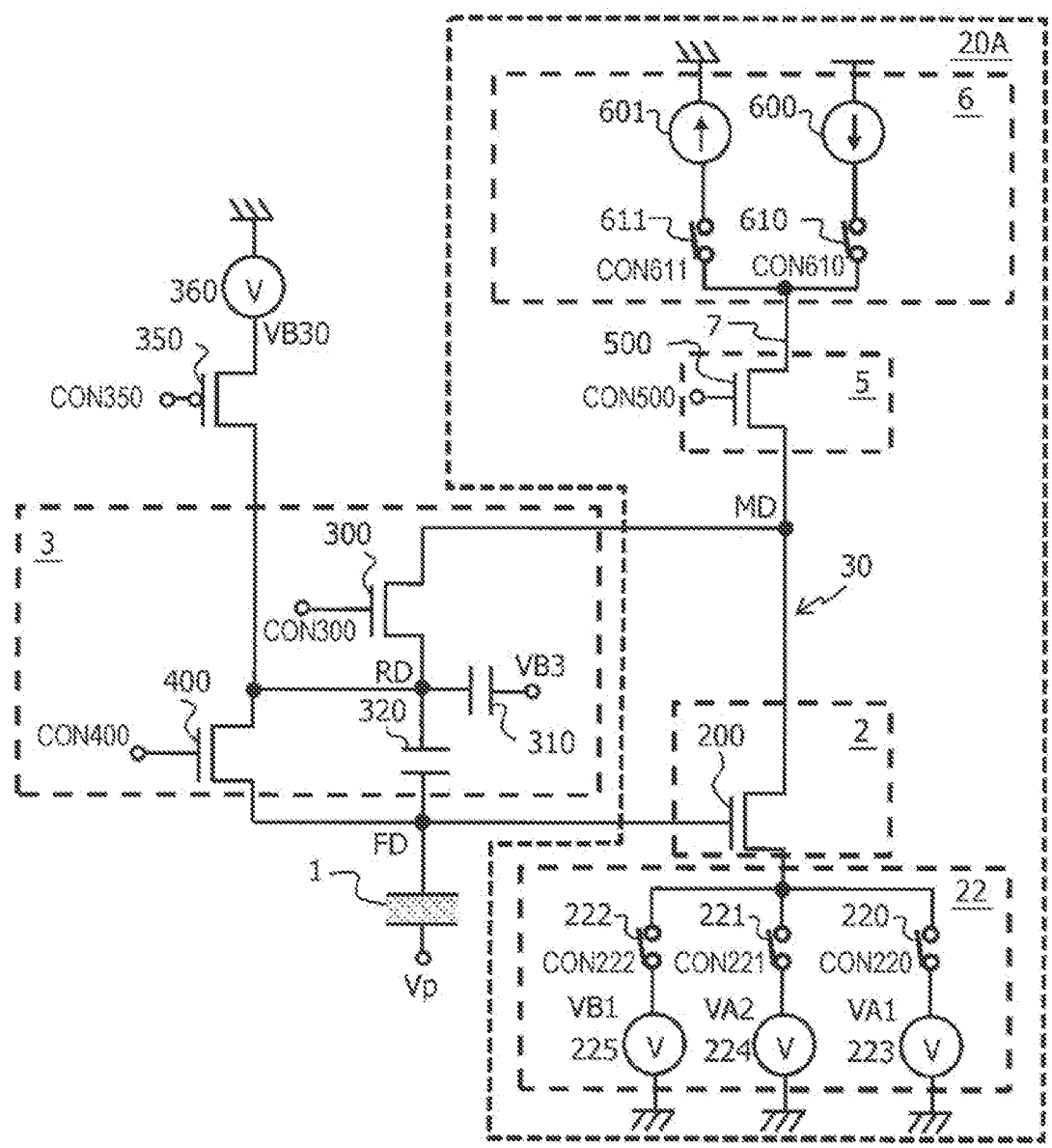
FIG. 11 is a schematic illustration of an exemplary circuit configuration of a readout circuit according to a third embodiment.

According to the third embodiment, a bias voltage supply 360 and a bias transistor 350 are used to achieve a common gate amplifier circuit. FIG. 11 illustrates a signal readout circuit according to the third embodiment. The bias transistor 350 is also referred to as a bias application transistor 350.

According to the third embodiment, one end of the noise holding capacitor 310 is connected to the RD region. The other end of the noise holding capacitor 310 is connected to the reference potential VB3. The reference potential VB3 is, for example, the ground potential GND.

The imaging device according to the third embodiment includes a bias voltage supply 360 and a bias transistor 350. One of the drain and the source of the bias transistor 350 is connected to the RD region. The other of the drain and the source of the bias transistor 350 is connected to the bias voltage supply 360. The bias voltage supply 360 outputs a control potential VB30.

A bias application control signal line CON350 is connected to the gate of the bias transistor 350. The state of the bias transistor 350 is determined by the potential of the bias application control signal line CON350. According to the present embodiment, the potential of the bias application control signal line CON350 is changed among at least two types of potentials.

According to the present embodiment, the imaging device supplies at least two different voltages to the gate of the bias transistor 350. As can be understood from the above description, the voltage is supplied via the bias application control signal line CON350. The at least two types of voltages supplied to the gate correspond to the at least two types of potentials applied to the bias application control signal line CON350.

More specifically, according to the present embodiment, the at least two types of potentials applied to the bias application control signal line CON350 include a high level potential and a low level potential. The high level potential is higher than the low level potential. The at least two types of voltages supplied to the gate of the bias transistor 350 include a high level voltage and a low level voltage. The high level voltage is higher than the low level voltage. The high level potential corresponds to the high level voltage. The low level potential corresponds to the low level voltage.

For example, the bias transistor 350 is off during a period in which the potential of the bias application control signal line CON350 is a high level potential. During the period, the bias voltage supply 360 and the RD region are electrically separated from each other.

During a period in which the potential of the bias application control signal line CON350 is a low level potential, the bias transistor 350 is on. During the period, the bias voltage supply 360 and the RD region are electrically connected to each other, and the control potential VB30 output from the bias voltage supply 360 is applied to the RD region.

The third embodiment is effective for noise suppression. A specific example of the operation performed by the readout circuit according to the third embodiment is described below.

[20th Period] At time t21, the potential of the selection control line CON500 is switched from the low level to the high level. As a result, the selection transistor 500 is switched from off to on. In this manner, the amplifier transistor 200 and the signal readout line 7 are electrically connected to each other.

At time t21, the potentials of the amplification control signal line CON300 and the reset control signal line CON400 are switched from the low level to the high level. As a result, the feedback transistor 300 and the reset transistor 400 are switched from off to on.

At time t21, the potential of the bias application control signal line CON350 is switched from the low level to the high level. As a result, the bias transistor 350 is switched from on to off.

At time t21, the switching circuit 22 and the current supply unit 6 are controlled. More specifically, the switch element 220 is controlled to be on, and the switch elements 221 and 222 are controlled to be off. As a result, the source or drain of the amplifier transistor 200 is connected to the voltage supply 223, and its potential becomes VA1. In addition, the switch element 610 is controlled to be on, and the switch element 611 is controlled to be off. As a result, the current supply 600 is connected to the signal readout line 7. By controlling the switching circuit 22 and the current supply unit 6 in this way, a voltage is supplied from the voltage supply 223 to the FD region via the amplifier transistor 200, the MD region, the feedback transistor 300, and the reset transistor 400 in this order. As a result, the potential of the FD region is reset to the reset potential VRST.

In this specific example, the reset potential VRST has a value that causes the amplifier transistor 200 to operate at the operating point OPα. The reset potential VRST is given by the following equation: VRST=VA1+Vα.

[21st Period] Subsequently, at time t22, the potential of the reset control line CON400 is switched from high level to low level. As a result, the reset transistor 400 is switched from on to off. When this switching is performed, kTC noise generated by the reset in the 20th Period remains in the FD region.

Subsequently, at time t23, the potential of the bias application control signal line CON350 is switched from the high level to the low level. As a result, the potential of the RD region is set to the control potential VB30. At this time, the control potential VB30 has a value that satisfies the following relational expression: VB30>VRST+(VA2−VA1)×(Cfd+Cc)/Cc.

Subsequently, at time t24, the potential of the amplification control signal line CON300 is switched from high level to low level, and the potential of the bias application control signal line CON350 is switched from low level to high level. As a result, the feedback transistor 300 and the bias application transistor 350 are switched from on to off.

As described above, by switching performed at time t23, the potential of the RD region increases to VB30 based on the bias voltage supply 360. Due to the increase, the potential of the FD region also increases via the feedback capacitor 320. As the potential of the FD region increases, the gate-source voltage or the gate-drain voltage of the amplifier transistor 200 increases to a value greater than Vα. The increase in voltage together with the inverting amplification performed by the amplifier transistor 200 decrease the potential of the MD region.

Subsequently, the switching circuit 22 is controlled at time t25. More specifically, the switch element 221 is controlled to be on, and the switch elements 220 and 222 are controlled to be off. As a result, the source or drain of the amplifier transistor 200 is connected to the voltage supply 224, and its potential becomes VA2. Note that VB30, VA1 and VA2 satisfy the above-described relational expression. For this reason, the gate-source voltage or the gate-drain voltage of the amplifier transistor 200 is decreased by the control performed at the time t25, but is still greater than the value Vα at the time t22. For this reason, the potential of the MD region is still at a low level.

Thereafter, during the period from time t26 to time t27, the potential of the amplification control signal line CON300 is set to the control potential VB2 which is an intermediate potential between the high level and the low level. As a result, the feedback transistor 300 operates in the saturation region and is in a state in which a potential difference can be generated between the source and the drain while allowing the source-drain current to flow.

At the beginning of the period from time t26 to time t27, a current flows from the drain to the source of the feedback transistor 300 (that is, from the RD region to the MD region). Due to this current, the potential of the RD region decreases. Along with the decrease, the potential of the FD region also decreases. If the potential of the FD region decreases, the gate-source voltage or the gate-drain voltage of the amplifier transistor 200 decreases so as to approach Vα. In addition, the decrease in voltage together with the inverting amplification performed by the amplifier transistor 200 increase the potential of the MD region.

During the period from time t26 to time t27, a portion of the feedback transistor 300 that is electrically connected to the MD region is the source. For this reason, if the potential of the MD region increases, the voltage between the gate and the source of the feedback transistor 300 decreases, and the current flowing between the drain and the source decreases. As a result, the decrease in potential of the RD region is moderated. When the gate-source voltage or the gate-drain voltage of the amplifier transistor 200 reaches Vα, the current flowing between the drain and source of the feedback transistor 300 becomes substantially zero, and the potential of the RD region becomes a constant value. Thus, the potentials of the MD region the FD region also become constant values.

When the potential of the RD region becomes a constant value, the gate-source voltage or the gate-drain voltage of the amplifier transistor 200 is Vα, which is the same as during the period prior to time t25. However, when the potential of the RD region becomes the constant value, the potential supplied from the switching circuit 22 to the amplifier transistor 200 is not VA1, but VA2. Accordingly, the potential of the FD region when the potential of the RD region becomes the constant value is VA2+Vα=VRST+(VA2−VA1). Since VA2>VA1, this potential is higher than the value VRST used during the period prior to time t25. Since the potential of the FD region increases with increasing potential of the RD region, the potential of the RD region that has become the constant value is higher than the potential of the RD region as of time t22.

Furthermore, during the period from time t26 to time t27, the bias transistor 350 is off. Accordingly, the RD region is in a floating state electrically disconnected from the bias voltage supply 360. For this reason, the RD region is in a high impedance state.

As described above, a situation is obtained in which the RD region is in a high impedance state and the potential of the RD region is higher than the potential of the MD region. In this situation, the feedback transistor 300 and the noise holding capacitor 310 operate as a common gate amplifier circuit. For this reason, the signal of the MD region is transmitted to the RD region with an amplification factor B greater than 1. In addition, the amplifier circuit 20A operates as a common source amplifier circuit. As a result, the signal of the FD region is amplified by a factor of $-A \times B \times Cc/(Cc+Cfd)$ and is fed back to the FD region.

At time t27, the potential of the amplification control signal line CON300 is switched from the high level to the low level.

Due to the feedback operation performed by the imaging device during a period of time from time t26 to t27, the kTC noise remaining in the FD region at time t22 is suppressed to become a value obtained by multiplying the kTC noise remaining in the FD region at time t12 by $1/(1+A \times B \times Cc/(Cc+Cfd))$. In addition, due to the feedback operation, the thermal noise generated in the feedback transistor 300 is suppressed to become a value obtained by multiplying by $1/\sqrt{(1+A \times Cc/(Cc+Cfd))}$ and is further suppressed to become a value obtained by multiplying by of $Cc/(Cfd+Cc)$ when being transmitted to the FD region. Therefore, the thermal noise generated by the feedback transistor 300 and remaining in the FD region at time t22 is suppressed to become $1/\sqrt{(1+A \times Cc/(Cc+Cfd))} \times Cc/(Cfd+Cc) \times \sqrt{(Cfd/Cs)}$ times the thermal noise remaining in the FD region at time t22.

[22nd Period] Subsequently, at time t28, an operation the same as that performed at time t6 according to the first embodiment is performed.

Subsequently, at time t29, an operation the same as that performed at time t7 according to the first embodiment is performed.

As can be understood from the above description, according to the third embodiment, one of the source and drain of the bias transistor 350 is connected to the other of the source and drain of the feedback transistor 300. The other of the source and drain of the bias transistor 350 is connected to the bias voltage supply 360. Even in this case, a common gate amplifier circuit can be achieved, and its amplifying operation can be provided.

According to the third embodiment, it is not essential that the common gate amplifier circuit has a current supply. This makes it possible to reduce the number of element circuits. This is advantageous from a viewpoint of low cost and low power consumption and can contribute to acquiring excellent image data having suppressed random noise.

According to the third embodiment, the bias transistor 350 is connected to the RD region. However, this is not essential.

For example, the bias transistor 350 may be connected to the MD region. In this case, when the bias transistor 350 is switched on, the feedback transistor 300 is also switched on. In this manner, a voltage can be supplied to the RD region.

In addition, the bias transistor 350 may be connected to the signal readout line 7. In this case, when the bias transistor 350 is switched on, the feedback transistor 300 and the selection transistor 500 are switched on at the same time. In this manner, a voltage can be supplied to the RD region. Furthermore, in this case, the bias transistor 350 may be shared by a plurality of pixels.

When the bias transistor 350 is connected to the RD region or the MD region, a voltage can be supplied to the inside of each of the pixels. This is advantageous from a viewpoint of achieving a high-speed response. In contrast, when the bias transistor 350 is connected to the signal readout line 7, the bias transistor 350 can be disposed outside the pixel, so that an increase in area of the pixel can be avoided. In this case, since the bias transistor 350 can be shared by a plurality of pixels, miniaturization of the imaging device is facilitated.

Fourth Embodiment

Figure 12:
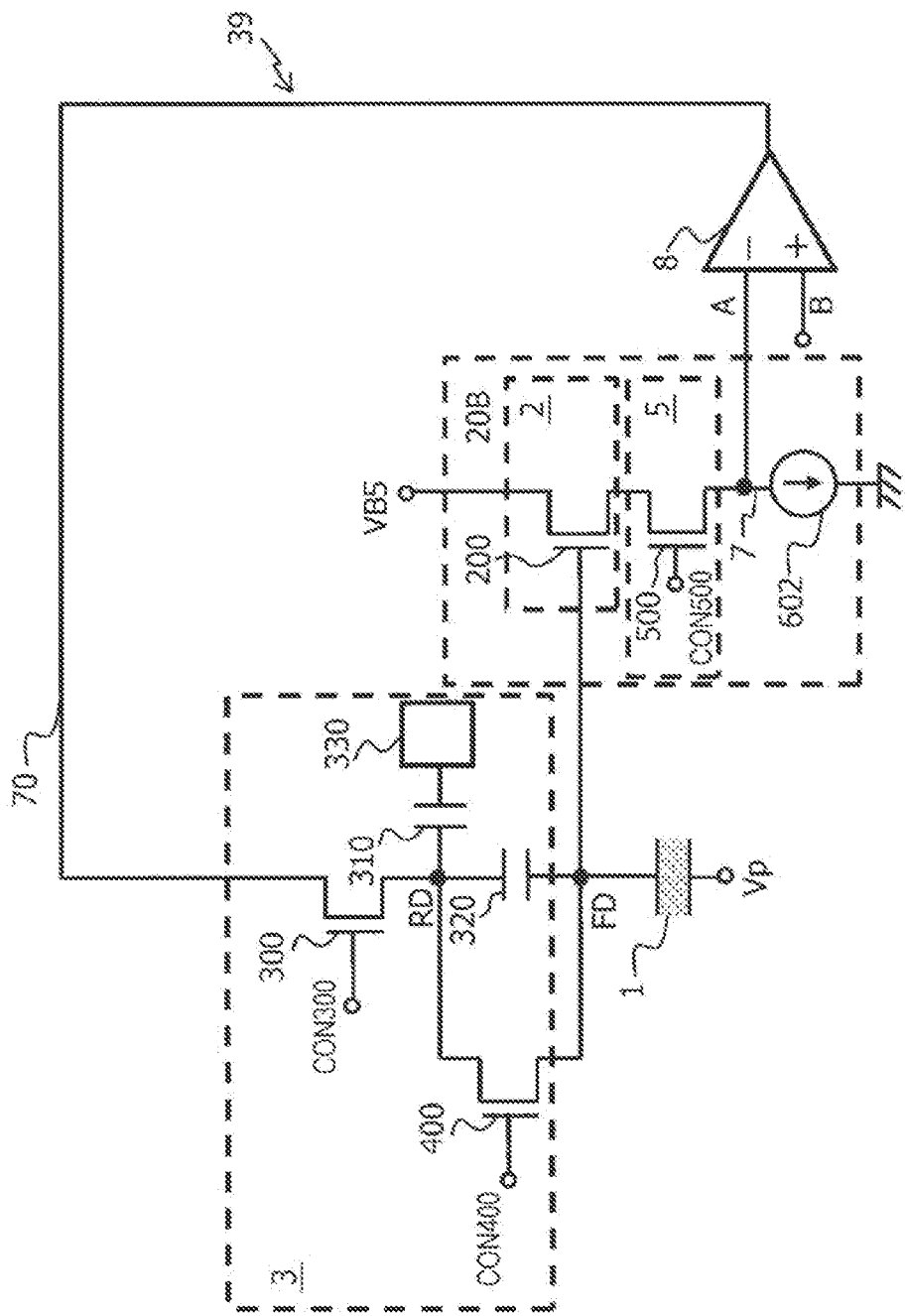
FIG. 12 is a schematic illustration of an exemplary circuit configuration of a readout circuit according to a fourth embodiment.

According to the fourth embodiment, a column amplifier unit 8 is used to achieve a common gate amplifier circuit. More specifically, column feedback is used to achieve the common gate amplifier circuit. FIG. 12 illustrates a signal readout circuit according to the fourth embodiment.

The imaging device according to the fourth embodiment includes a plurality of column amplifier units 8. The column amplifier unit 8 is shared by two or more pixels. In a specific example, a plurality of pixels form a pixel array, and a column amplifier unit 8 is provided for each of the columns of the pixel array.

The drain or source of the selection transistor 500 is connected to the signal readout line 7. The signal readout line 7 is shared by at least two pixels. The signal readout line 7 is connected to a current supply 602.

According to the fourth embodiment, a source follower circuit 20B is provided. The source follower circuit 20B includes the amplifier transistor 200, the selection transistor 500, and the current supply 602.

The source or drain of the amplifier transistor 200 is connected to a reference potential VB5. The reference potential VB5 is, for example, the power supply potential VDD.

The drain or source of the feedback transistor 300 is connected to a signal feedback line 70. The signal feedback line 70 is shared by at least two pixels.

The column amplifier unit 8 is connected to the signal readout line 7. The signal feedback line 70 is connected to an output terminal of the column amplifier unit 8.

Thus, in the example illustrated in FIG. 12, a circulation path 39 is provided that connects the FD region to the amplifier transistor 200 to the column amplifier unit 8 to the feedback transistor 300 to the FD region. More specifically, the circulation path 39 connects the FD region to the amplifier transistor 200, to the selection transistor 500, to the column amplifier unit 8, to the feedback transistor 300, to the RD region, to the feedback capacitor 320, and to the FD region in this order.

With this connection, the signal of the FD region can be fed back to the FD region through the amplifier transistor 200, the column amplifier unit 8, and the feedback transistor 300 in this order. More specifically, the signal of the FD region is fed back to the FD region through the amplifier transistor 200, the selection transistor 500, the column amplifier unit 8, the feedback transistor 300, the RD region, and the feedback capacitor 320. This feedback is a negative feedback.

For example, the feedback transistor 300 is off during a period in which the potential of the amplification control signal line CON300 is a low level potential. During the period, the feedback of the signal of the FD region described above is not performed.

During a period in which the potential of the amplification control signal line CON300 is an intermediate potential, the feedback transistor 300 operates in the saturation region. During the period, a resistance component appears between the source and drain of the feedback transistor 300. This resistance component has an appropriate magnitude. Therefore, during the period, a potential difference can be generated between the RD region and the signal feedback line 70 while performing feedback of the signal of the FD region. As can be understood from the description below, in this situation, the common gate amplifier circuit can exert an effect of amplification.

During a period in which the potential of the amplification control signal line CON300 is a high level potential, the feedback transistor 300 is on. During the period, the feedback of the signal of the FD region described above is performed. However, during the period, since the feedback transistor 300 is on, the potentials of the RD region and the signal feedback line 70 are the same and, thus, the common gate amplifier circuit does not exert an effect of amplification.

Figure 13:
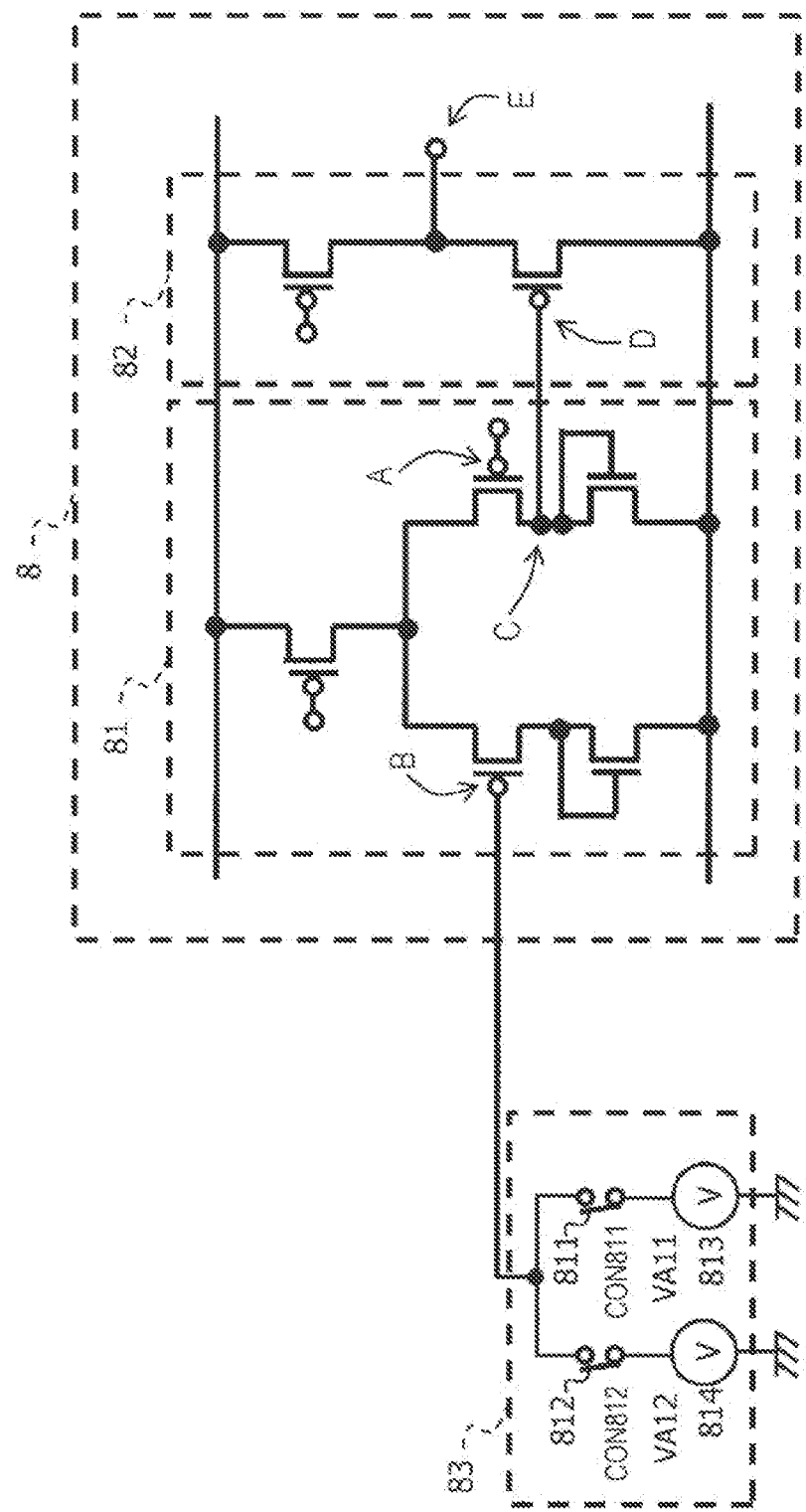
FIG. 13 is a schematic illustration of an exemplary circuit configuration of a column amplifier unit and an input switching circuit.

The column amplifier unit 8 and its control circuit according to the fourth embodiment is described in detail below with reference to FIG. 13.

The column amplifier unit 8 includes a differential amplifier circuit 81 and a source follower circuit 82. The differential amplifier circuit 81 has input terminals A and B. The signal readout line 7 is connected to the input terminal A. An input switching circuit 83 is connected to the input terminal B. An output terminal C of the differential amplifier circuit 81 is connected to an input terminal D of the source follower circuit 82. An output terminal E of the source follower circuit 82 is connected to the signal feedback line 70.

The differential amplifier circuit 81 amplifies the difference between the potential of the input terminal B and the potential of the input terminal A and outputs the amplified difference from the output terminal E of the source follower circuit 82. As viewed from the input terminal A, the column amplifier unit 8 operates as an inverting amplifier circuit. For this reason, the signal of the FD region can be output from the source follower circuit 20B, be inverted and amplified by the column amplifier unit 8 and, thereafter, be fed back to the FD region via the feedback transistor 300 and the feedback capacitor 320.

The input switching circuit 83 includes switch elements 811 and 812 and voltage supplies 813 and 814.

The voltage supply 813 outputs a reference potential VA11. The voltage supply 814 outputs a reference potential VA12. The reference potential VA12 is higher than the reference potential VA11. Furthermore, the reference potential VA12 is lower than the reference potential VB5. That is, the magnitude relationship of VA11<VA12<VB5 is established.

The voltage supply 813 is connected to the switch element 811. The voltage supply 813 can be connected to the input terminal B via the switch element 811. The voltage supply 814 is connected to the switch element 812. The voltage supply 814 can be connected to the input terminal B via the switch element 812.

A reference potential switching control signal line CON811 is connected to the switch element 811. The state of the switch element 811 is determined by the potential of the reference potential switching control signal line CON811.

According to the present embodiment, the potential of the reference potential switching control signal line CON811 can be set to a high level potential or a low level potential. The high level potential is higher than the low level potential.

For example, the switch element 811 is on during a period in which the potential of the reference potential switching control signal line CON811 is a high level potential. During the period, the voltage supply 813 is connected to the column amplifier unit 8.

During a period in which the potential of the reference potential switching control signal line CON811 is a low level potential, the switch element 811 is off. During the period, the column amplifier unit 8 and the voltage supply 813 are electrically separated from each other.

A reference potential switching control signal line CON812 is connected to the switch element 812. The state of the switch element 812 is determined by the potential of the reference potential switching control signal line CON812.

For example, the switch element 812 is on during a period in which the potential of the reference potential switching control signal line CON812 is a high level potential. During the period, the voltage supply 814 is connected to the column amplifier unit 8.

During a period in which the potential of the reference potential switching control signal line CON812 is a low level potential, the switch element 812 is off. During the period, the column amplifier unit 8 and the voltage supply 814 are electrically separated from each other.

The column amplifier unit 8 amplifies the difference between the two signals input to the input terminals A and B of the differential amplifier circuit 81 and outputs the amplified difference. More specifically, when the potential of the reference potential switching control signal line CON811 is at a high level, a signal obtained by inverting and amplifying the difference between the potential of the signal readout line 7 and the reference potential VA11 is output to the signal feedback line 70. When the reference potential switching control signal line CON812 is at a high level, a signal obtained by inverting and amplifying the difference between the potential of the signal readout line 7 and the reference potential VA12 is output to the signal feedback line 70.

The fourth embodiment is effective for noise suppression. A specific example of the operation performed by the readout circuit according to the fourth embodiment is described below.

[30th Period] At time t31, the potential of the selection control line CON500 is switched from the low level to the high level. As a result, the selection transistor 500 is switched from off to on. In this manner, the amplifier transistor 200 and the signal readout line 7 are electrically connected to each other.

At time t31, the potentials of the amplification control signal line CON300 and the reset control signal line CON400 are switched from the low level to the high level. As a result, the feedback transistor 300 and the reset transistor 400 are switched from off to on.

At time t31, the potential of the reference potential switching signal line CON811 is switched from the low level to the high level. As a result, the reference potential VA11 is input to the input terminal B of the column amplifier unit 8. The potential of the input terminal A and the potential of the signal readout line 7 follow the potential of the input terminal B due to a virtual short circuit of the input terminals A and B of the column amplifier unit 8. For this reason, the potential of the FD region becomes a reset potential VRST2 suitable for the potential of the signal readout line 7 to be the reference potential VA11. More specifically, since the potential of the drain or source of the amplifier transistor 200 also follows the potential of the input terminal B and becomes the reference potential VA11, the reset potential VRST2 is as follows: VRST2=VA11+Vα.

During 30th Period, the output potential of the variable voltage supply 330 is fixed to the control potential VB10.

[31st Period] Subsequently, at time t32, an operation the same as that performed at time t2 according to the first embodiment is performed.

Subsequently, at time t33, the reference potential switching signal line CON811 is switched from the high level to the low level, and the potential of the reference potential switching signal line CON812 is switched from the low level to the high level. As a result, the input potential input to the input terminal B of the column amplifier unit 8 is switched from the reference potential VA11 to the reference potential VA12. VA12 is higher than VA11. By switching from VA11 to VA12, the potential input to the input terminal B is temporarily higher than the potential input to the input terminal A of the column amplifier unit 8. Accordingly, the output potential increases due to the differential amplification performed by the column amplifier unit 8, and the potential of the signal feedback line 70 also increases.

Thereafter, during the period from time t34 to time t35, the potential of the amplification control signal line CON300 is set to the control potential VB40 that is an intermediate potential between the high level and the low level. As a result, the feedback transistor 300 operates in the saturation region and enters a state in which a potential difference can be generated between the source and the drain while allowing the source-drain current to flow. In addition, the output potential of the variable voltage supply 330 gradually increases from the control potential VB11 to the control potential VB12. A specific example of how to increase the potential has already been described in the first embodiment.

The behavior of the imaging device during the period from time t34 to time t35 can be described as follows.

During the period from time t34 to time t35, a part of the feedback transistor 300 that is electrically connected to the signal feedback line 70 is the source. For this reason, when the potential of the signal feedback line 70 is high, the feedback transistor 300 has a low gate-source voltage and, thus, is off. In contrast, when the potential of the signal feedback line 70 is low, the feedback transistor 300 has a high gate-source voltage and, thus, is on. Note that, unlike the first embodiment, the amplifier transistor 200 operates as a transistor of the source follower circuit 20B and performs output without inverting the polarity.

As described above, at time t33, the input potential input to the input terminal B of the column amplifier unit 8 is switched from the reference potential VA11 to the reference potential VA12 and is temporarily higher than the potential input to the input terminal A of the column amplifier unit 8. The potential difference between the input terminals A and B together with the differential amplifying operation performed by the column amplifier unit 8 make the potential of the signal feedback line 70 be at a high level. Therefore, at the beginning of the period from time t34 to time t35, the potential of the signal feedback line 70 is high. For this reason, the feedback transistor 300 is off.

If the output potential of the variable voltage supply 330 increases during the period from time t34 to time t35, the potential of the RD region also increases so that the charge of the noise holding capacitor 310 is retained. In addition, the potential of the FD region increases due to the increase in potential of the RD region. As the potential of the FD region increases, the output potential of the amplifier transistor 200 also increases. Similarly, the potential of the signal readout line 7 also increases and approaches the reference potential VA12. As a result, the potential difference between the input terminals A and B is decreased, and the output potential through the differential amplification performed by the column amplifier unit 8 is decreased. For this reason, the potential of the signal feedback line 70 decreases. If the potential of the signal feedback line 70 decreases, the gate-source voltage of the feedback transistor 300 increases. In the feedback transistor 300, a current starts flowing from the drain toward the source (that is, from the RD region toward the signal feedback line 70) at a certain point in time. When the current starts flowing, the effect of the increase in the output potential of the variable voltage supply 330 on an increase in the potential of the RD region is partially canceled out by this current. For this reason, the increase in potential of the RD region becomes moderate and, thus, an increase in potential of the FD region also becomes moderate. When the potential of the signal readout line 7 reaches the reference potential VA12, the potential of the RD region becomes a constant value, and the potentials of the signal feedback line 70 and the FD region also become constant values. In this way, various potentials change during the period in which the potential of the input terminal A of the column amplifier unit 8 approaches the potential of the input terminal B due to a virtual short circuit.

When the potential of the RD region becomes a constant value, the gate-source voltage or the gate-drain voltage of the amplifier transistor 200 is V$\alpha$, as during the period prior to time t33. However, at time t33, the input potential input to the input terminal B of the column amplifier unit 8 increases from VA11 to VA12. The increase in the input potential together with the virtual short circuit of the input terminals A and B of the column amplifier unit 8 causes the potential of the input terminal A and the potential of the signal readout line 7 to follow VA12. The potential of the drain or source of the amplifier transistor 200 also follows VA12. As a result, the potential of the FD region when the potential of the RD region becomes a constant value is VA12+V$\alpha$=VRST2+(VA12−VA11). Since VA12>VA11, this potential is higher than the value VRST2 used during the period prior to time t33. Since the potential of the FD region increases with increasing potential of the RD region, the potential of the RD region, which has become a constant value, is higher than the potential of the RD region as of time t32.

At this time, the output potential of the variable voltage supply 330 has changed during the period from time t34 to time t35. For this reason, electric charge is discharged from the noise holding capacitor 310. Due to the discharge of the electric charge, a current flows from the drain to source of the feedback transistor 300. The amount of the current is Cs×K.

As can be understood from the above description, a situation can be obtained in which the noise holding capacitor 310 and the variable voltage supply 330 operate as a current supply, and the potential of the RD region is higher than the potential of the signal feedback line 70. In this situation, the feedback transistor 300, the noise holding capacitor 310, and the variable voltage supply 330 operate as a common gate amplifier circuit. For this reason, the signal on the signal feedback line 70 is transmitted to the RD region with an amplification factor B2 greater than 1. As a result, the signal of the FD region is amplified by a factor of −A2×B2×Cc/(Cc+Cfd) and is fed back to the FD region. Note that −A2 is the amplification factor of the column amplifier unit 8.

At time t35, the output of the variable voltage supply 330 is fixed to the control potential VB12. In addition, the potential of the amplification control line CON300 is switched from the high level to the low level.

Due to the feedback operation performed by the imaging device from time t34 to t35, the kTC noise remaining in the FD region at time t35 is suppressed to a value obtained by multiplying the kTC noise remaining in the FD region at time t32 by $1/(1+A2 \times B2 \times Cc/(Cc+Cfd))$. Furthermore, due to the feedback operation, the thermal noise generated by the feedback transistor 300 is suppressed to become a value obtained by multiplying by $1/\sqrt{(1+A2 \times Cc/(Cc+Cfd))}$. Thereafter, the thermal noise is further suppressed to become a value obtained by multiplying by Cc/(Cfd+Cc) when being transmitted to the FD region. Consequently, the thermal noise generated by the feedback transistor 300 and remaining in the FD region at time t35 is suppressed to $1/\sqrt{(1+A2\times Cc/(Cc+Cfd))} \times Cc/(Cfd+Cc) \times \sqrt{(Cfd/Cs)}$ times the thermal noise remaining in the FD region at time t32.

[32nd Period] At time t36, the voltage of the FD region has changed from the reset voltage by a voltage corresponding to the amount of signal charge generated by the photoelectric converter 1 during the period from time t35 to t36. The signal of the FD region is output to the signal readout line 7 with an amplification factor of about 1 at time t37.

Here, the random noise is the fluctuation of the output when the signal charge generated by the photoelectric converter 1 is 0, that is, the square sum of the kTC noise and the thermal noise of the feedback transistor 300. In "31st Period", the kTC noise is suppressed to become a value obtained by multiplying $1/(1+A2\times B2 \times Cc/(Cc+Cfd))$, and the thermal noise of the feedback transistor 300 is suppressed to become a value obtained by multiplying $1/\sqrt{(1+A2\times Cc/(Cc+Cfd))} \times Cc/(Cfd+Cc) \times \sqrt{(Cfd/Cs)}$. For example, when the amplification factor B2 is 100, Cc is 0.1 times Cfd, and Cs is 25 times Cfd, the kTC noise is suppressed to become 1/76, and the thermal noise of the feedback transistor 300 is also suppressed to become 1/52 of the kTC noise at time t32 even if the amplification factor A2 is 10. As a result, the signal charge converted by the photoelectric converter 1 can be read out with random noise greatly suppressed.

As can be understood from the above description, the imaging device according to the fourth embodiment includes the differential amplifier circuit 81 and the first voltage supply circuit. The differential amplifier circuit 81 has the first input terminal A, the second input terminal B, and the output terminal E. The first input terminal A is connected to one of the source and drain of the amplifier transistor 200. The output terminal E is connected to one of the source and drain of the feedback transistor 300. The first voltage supply circuit is connected to the second input terminal B. The first voltage supply circuit selectively outputs at least two different voltages. In the example illustrated in FIG. 13, the first voltage supply circuit corresponds to the input switching circuit 83.

Fifth Embodiment

Figure 14:
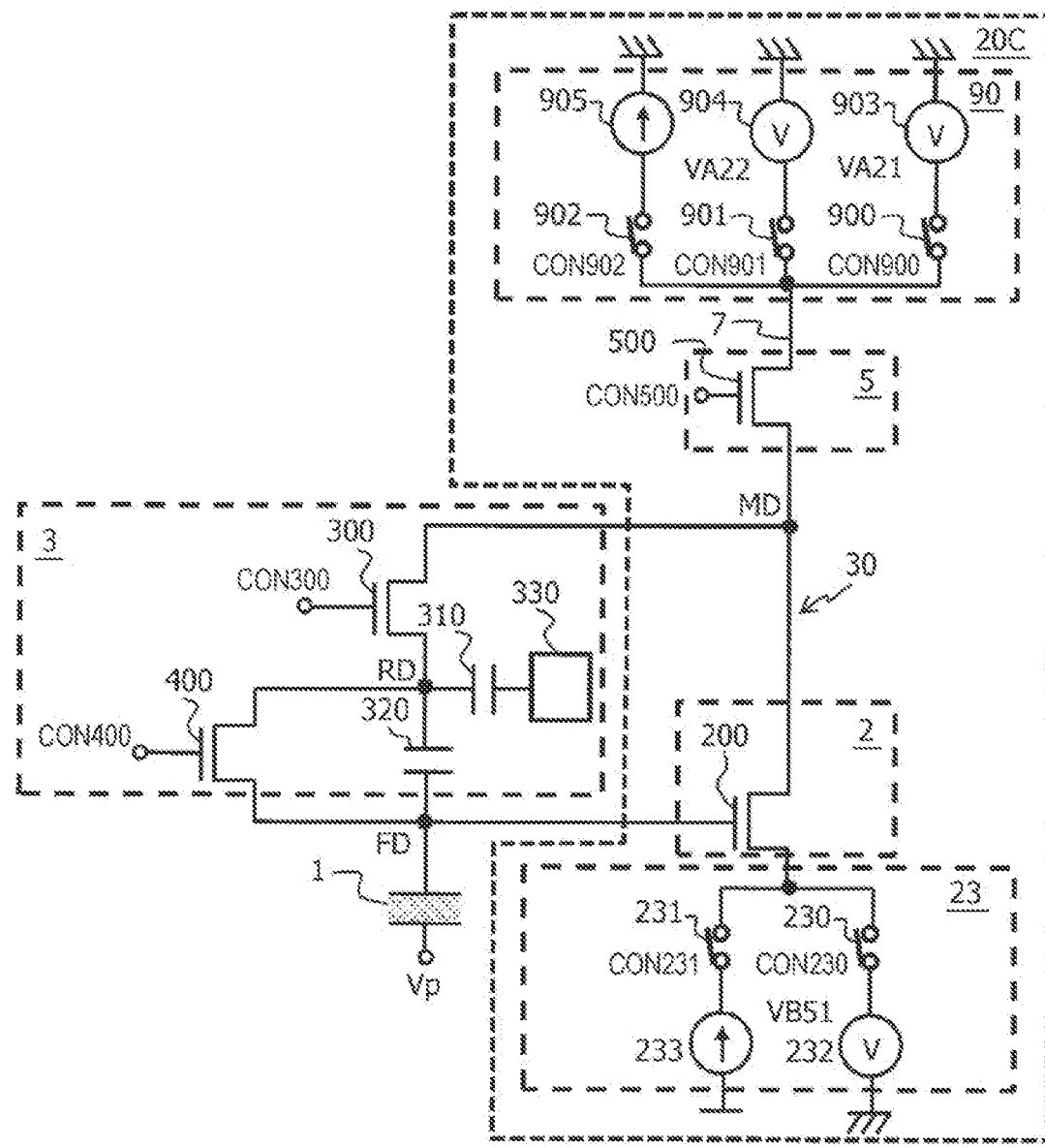
FIG. 14 is a schematic illustration of an exemplary circuit configuration of a readout circuit according to a fifth embodiment.

FIG. 14 illustrates a signal readout circuit according to the fifth embodiment.

In the example illustrated in FIG. 14, a switching circuit 23 is connected to the source or drain of the amplifier transistor 200. The switching circuit 23 includes switch elements 230 and 231, a voltage supply 232, and a current supply 233.

The voltage supply 232 outputs a control potential VB51. The control potential VB51 is, for example, the power supply potential VDD. The current supply 233 generates a current that flows from the current supply 233 toward the source or drain of the amplifier transistor 200.

The voltage supply 232 can be connected to the source or drain of the amplifier transistor 200 via the switch element 230. The current supply 233 can be connected to the source or drain of the amplifier transistor 200 via the switch element 231.

A switch element control signal line CON230 is connected to the switch element 230. A switch element control signal line CON231 is connected to the switch element 231. According to the present embodiment, the imaging device controls the potentials of the plurality of (two in the example illustrated in FIG. 14) switch element control signal lines CON230 and CON231 so that one selected from the plurality of (two in the example illustrated in FIG. 14) switch elements 230 and 231 is switched on and the other is switched off. In this manner, it is switchable whether the potential VB51 is applied to or the current supply 233 is connected to the source or drain of the amplifier transistor 200.

In one example, the switching circuit 23 is provided for each of the pixels. In another example, the switching circuit 23 is shared by a plurality of pixels. According to the example, the number of elements per pixel can be reduced.

In the example illustrated in FIG. 14, a switching circuit 90 is connected to the signal readout line 7. The switching circuit 90 includes switch elements 900, 901, and 902, voltage supplies 903 and 904, and a current supply 905.

The voltage supply 903 outputs a reference potential VA21. The voltage supply 904 outputs a reference potential VA22. The reference potential VA21 is, for example, the ground potential GND. The reference potential VA22 is higher than the reference potential VA21, and the control potential VB51 is higher than the reference potential VA22. That is, the magnitude relationship of VA21<VA22<VB51 is established. The current supply 905 generates a current that flows from the signal readout line 7 toward the current supply 905.

The voltage supply 903 can be connected to the signal readout line 7 via the switch element 900. The voltage supply 904 can be connected to the signal readout line 7 via the switch element 901. The current supply 905 can be connected to the signal readout line 7 via the switch element 902.

A switch element control signal line CON900 is connected to the switch element 900. A switch element control signal line CON901 is connected to the switch element 901. A switch element control signal line CON902 is connected to the switch element 902. According to the present embodiment, the imaging device controls the potentials of a plurality of (three in the example illustrated in FIG. 14) switch element control signal lines CON900, CON901, and CON902 so that one selected from the plurality of (three in the illustrated in FIG. 14) switch elements 900, 901, and 902 is switched on and the others are switched off. In this manner, it is switchable whether the reference potential VA21 is applied to, the reference potential VA22 is applied to, or the current supply 905 is connected to the signal readout line 7.

According to the imaging device of the present embodiment, an amplifier circuit 20C is provided. The amplifier circuit 20C includes the switching circuit 23, the amplifier transistor 200, the selection transistor 500, and the switching circuit 90.

Control of the switch elements of the switching circuit 90 can be performed in conjunction with control of the switch elements of the switching circuit 23. For example, the control of the switch elements can be linked so that the following first connection state and second connection state are switched.

In the first connection state, among the plurality of switch elements 230 and 231 of the switching circuit 23, the switch element 231 is on, and the other switch elements are off. In addition, in the first connection state, the switch element 900 or 901 among the plurality of switch elements 900, 901, and 902 of the switching circuit 90 is on, and the other switch elements are off. Accordingly, in the first connection state, the current supply 233 is connected to the source or drain of the amplifier transistor 200, and the voltage supply 903 or 904 is connected to the signal readout line 7. Thus, the potential of the signal readout line 7 is set to VA21 or VA22. According to the first connection state, the amplifier circuit 20C can be operated as a common source amplifier circuit having a high voltage amplification factor.

In the second connection state, among the plurality of switch elements 230 and 231 of the switching circuit 23, the switch element 230 is on, and the other switch element is off. In addition, in the second connection state, among the plurality of switch elements 900, 901 and 902 of the switching circuit 90, the switch element 902 is on, and the other switch elements are off. For this reason, in the second connection state, if the voltage supply 232 is connected to the source or drain of the amplifier transistor 200, the potential of the source or drain of the amplifier transistor 200 is set to VB51, and the current supply 905 is connected to the signal readout line 7. According to the second connection state, the amplifier circuit 20C can be operated as a source follower circuit having a voltage amplification factor of approximately 1.

Furthermore, the example illustrated in FIG. 14 can be described as follows. The imaging device includes a first current supply 233 configured to be connected to one of the source and drain of the amplifier transistor 200 and the second current supply 905 configured to be connected to the other of the source and drain of the amplifier transistor 200. The imaging device is configured such that one of the first current supply 233 and the second current supply 905 is electrically connected to the amplifier transistor 200. The direction of the current flowing through the amplifier transistor 200 when the first current supply 233 is electrically connected to the amplifier transistor 200 is the same as that when the second current supply 905 is electrically connected to the amplifier transistor 200.

The following description is common to the examples illustrated in FIGS. 6 to 11 and FIG. 14. The imaging device according to each of these examples includes a first voltage supply source and a first current supply source. In the first connection state, the first current supply source is connected to the amplifier transistor 200, which is connected to the first voltage supply source. In addition, the first current supply source is disposed such that a current flows in a direction from the first current supply source to the first voltage supply source via the amplifier transistor 200. In the first connection state, the voltage amplification factor of the amplifier circuit including the amplifier transistor 200 can be changed.

In the examples illustrated in FIGS. 6 to 11, the current supply 600 corresponds to the first current supply source. The voltage supply 223 or 224 corresponds to the first voltage supply source. The amplifier circuit corresponds to the amplifier circuit 20A.

In the example illustrated in FIG. 14, the current supply 233 corresponds to the first current supply source. The voltage supply 903 or 904 corresponds to the first voltage supply source. The amplifier circuit corresponds to the amplifier circuit 20C.

In the first connection state, the amplifier circuits 20A and 20C can operate as a common source amplifier circuit. In the first connection state, the voltage amplification factors of the amplifier circuits 20A and 20C can be changed. For example, the constant current supply 600 includes a circuit including a PMOS transistor 620 and a PMOS transistor 621 having a sufficiently larger W/L ratio than the PMOS transistor 620. By switching between a period in which a constant current is generated by using the PMOS transistor 620 and a period in which a constant current is generated by using the PMOS transistor 621 in the first connection state, the voltage amplification factor can be changed. The ratio of the maximum value to the minimum value of the voltage amplification factor in the first connection state is, for example, 10 or greater. Note that the transistors 620 and 621 are formed on a semiconductor substrate. The W/L ratio is the aspect ratio of a transistor when the semiconductor substrate is viewed in plan. Let L be the gate length of the transistor, and let W be the gate width of the transistor. Then, the W/L ratio is given by W/L.

The fifth embodiment is effective for noise suppression. A specific example of the operation performed by the readout circuit according to the fifth embodiment is described below.

[40th Period] At time t41, the potential of the selection control line CON500 is switched from the low level to the high level. As a result, the selection transistor 500 is switched from off to on. In this manner, the amplifier transistor 200 and the signal readout line 7 are electrically connected to each other.

At time t41, the potentials of the amplification control signal line CON300 and the reset control signal line CON400 are switched from the low level to the high level. As a result, the feedback transistor 300 and the reset transistor 400 are switched from off to on.

At time t41, the switching circuits 23 and 90 are controlled. More specifically, the switch element 231 is controlled to be on, and the switch element 230 is controlled to be off. As a result, the source or drain of the amplifier transistor 200 is connected to the current supply 233. In addition, the switch element 900 is controlled to be on, and the switch elements 901 and 902 are controlled to be off. As a result, the voltage supply 903 is connected to the signal readout line 7, and its potential becomes VA21. By controlling the switching circuits 23 and 90, a voltage is supplied from the voltage supply 903 to the FD region via the selection transistor 500, the MD region, the feedback transistor 300, and the reset transistor 400 in this order. As a result, the potential of the FD region is reset to the reset potential VRST.

In this specific example, the reset potential VRST has a value that causes the amplifier transistor 200 to operate at the operating point OPα. The reset potential VRST is given by the following equation: VRST=VA21+Vα. As described above, the voltage Vα is a gate-source voltage or a gate-drain voltage when a source-drain current flows in the amplifier transistor 200. In addition, in this context and related context, the gate-source voltage or the gate-drain voltage of the amplifier transistor 200 represents the potential difference between the gate voltage of the amplifier transistor 200 and one of the source and the drain of the amplifier transistor 200 to which a bias voltage is applied. In the example illustrated in FIG. 14, the gate-source voltage or the gate-drain voltage of the amplifier transistor 200 represents the potential difference between the gate voltage of the amplifier transistor 200 and the connection portion of the amplifier transistor 200 and the voltage supply 903, 904, or 232.

In the 40th Period, the output potential of the variable voltage supply 330 is fixed to the control potential VB10.

[41st Period] Subsequently, at time t42, an operation the same as that performed at time t2 according to the first embodiment is performed.

Subsequently, the switching circuit 90 is controlled at time t43. More specifically, the switch element 901 is controlled to be switched on, and the switch elements 900 and 902 are controlled to be off. As a result, the signal readout line 7 is connected to the voltage supply 904, and its potential becomes VA22. The potential VA22 is higher than the potential VA21. For this reason, the gate-source voltage or the gate-drain voltage of the amplifier transistor 200 decreases, and the amplifier transistor 200 is in the off state or nearly off state. In addition, switching of the potential from VA21 to VB22 increases the potential of the MD region.

Thereafter, during the period from time t44 to time t45, the potential of the amplification control signal line CON300 is set to the control potential VB2 which is an intermediate potential between the high level and the low level. As a result, the feedback transistor 300 operates in the saturation region and enters a state in which a potential difference can be generated between the source and the drain while allowing the source-drain current to flow. In addition, the output potential of the variable voltage supply 330 gradually increases from the control potential VB11 to the control potential VB12. A specific example of how to increase the potential has already been described in the first embodiment.

The behavior of the imaging device during the period from time t44 to time t45 can be described as follows.

During the period from time t44 to time t45, a portion of the feedback transistor 300 that is electrically connected to the MD region is the source. For this reason, when the potential of the MD region is high, the feedback transistor 300 has a low gate-source voltage and, thus, is off. However, when the potential of the MD region is low, the feedback transistor 300 has a high gate-source voltage and, thus, is on. During the period, the amplifier circuit 20C operates as a common source amplifier circuit. For this reason, the amplifier transistor 200 operates as a transistor of a common source amplifier circuit and performs inverting amplification.

As described above, at time t43, the potential of the drain or source of the amplifier transistor 200 increases from VA21 to VA22, and the potential of the MD region is at a high level. For this reason, at the beginning of the period from time t44 to time t45, the potential of the MD region is high. For this reason, the feedback transistor 300 is off. In addition, due to the potential increase from VA21 to VA22 at time t43, the gate-source voltage or the gate-drain voltage of the amplifier transistor 200 decreases. For this reason, at the beginning of the period from time t44 to time t45, the amplifier transistor 200 has a low gate-source voltage or a low gate-drain voltage and, thus, is in the off state or nearly off state.

During the period from time t44 to time t45, if the output potential of the variable voltage supply 330 increases, the potential of the RD region also increases so that the charge in the noise holding capacitor 310 is retained. In addition, the potential of the FD region increases due to the increase in potential of the RD region. As the potential of the FD region increases, the gate-source voltage or the gate-drain voltage of the amplifier transistor 200 increases so as to approach VRST−VA21=Vα. The voltage increase together with the inverting amplifying operation performed by the amplifier transistor 200 decreases the potential of the MD region. If the potential of the MD region decreases, the gate-source voltage of the feedback transistor 300 increases. In addition, in the feedback transistor 300, a current starts flowing from the drain to the source (that is, from the RD region to the MD region) at a certain point in time. If the current starts flowing, the effect of the increase in the output potential of the variable voltage supply 330 on an increase in the potential of the RD region is partially canceled out by the current. For this reason, the potential increase in the RD region becomes moderate and, thus, the potential increase in the FD region also becomes moderate. When the gate-source voltage or the gate-drain voltage of the amplifier transistor 200 reaches Vα, the potential of the RD region becomes a constant value, and the potentials of the MD region and the FD region also become constant values.

When the potential of the RD region becomes a constant value, the gate-source voltage or the gate-drain voltage of the amplifier transistor 200 is Vα, which is the same as in the period prior to time t43. However, when the potential of the RD region becomes a constant value, the potential supplied from the switching circuit 90 to the amplifier transistor 200 is not VA21 but VA22. Consequently, the potential of the FD region when the potential of the RD region becomes a constant value is VA22+Vα=VRST+(VA22−VA21). Since VA22>VA21, this potential is higher than the value VRST used during the period prior to time t43. Since the potential of the FD region increases with increasing potential of the RD region, the potential of the RD region that has become a constant value is higher than the potential of the RD region as of time t42.

At this time, the output potential of the variable voltage supply 330 has changed during the period from time t44 to time t45. For this reason, electric charge is discharged from the noise holding capacitor 310. Due to the discharge of the electric charge, a current flows from the drain to the source of the feedback transistor 300. The amount of the current is Cs×K, where Cs is a capacitance value of the noise holding capacitor 310, and K is the amount of change in potential per unit time of the output potential of the variable voltage supply 330 (that is, the time rate of change in output potential).

As can be understood from the above description, a situation can be obtained in which the noise holding capacitor 310 and the variable voltage supply 330 operate as current supplies, and the potential of the RD region is higher than the potential of the MD region. In this situation, the feedback transistor 300, the noise holding capacitor 310, and the variable voltage supply 330 operate as a common gate amplifier circuit. For this reason, the signal of the MD region is transmitted to the RD region with an amplification factor B greater than 1. In addition, the amplifier circuit 20C operates as a common source amplifier circuit. Consequently, the signal of the FD region is amplified by a factor of −A×B×Cc/(Cc+Cfd) and is fed back to the FD region. Note that −A is an amplification factor of common source amplification. Cc is the capacitance value of the feedback capacitor 320. Cfd is the capacitance value of the FD region.

At time t45, the output of the variable voltage supply 330 is fixed to the control potential VB12. In addition, the potential of the amplification control signal line CON300 is switched from the high level to the low level.

Due to the feedback operation performed by the imaging device from time t44 to t45, the kTC noise remaining in the FD region at time t45 is suppressed to become a value obtained by multiplying the kTC noise remaining in the FD region at time t42 by $1/(1+A\times B\times Cc/(Cc+Cfd))$. In addition, due to the feedback operation, the thermal noise generated in the feedback transistor 300 is suppressed to become a value obtained by multiplying by $1/\sqrt{(1+A\times Cc/(Cc+Cfd))}$ and is further suppressed to become a value obtained by multiplying by $Cc/(Cfd+Cc)$ when being transmitted to the FD region. Consequently, the thermal noise generated by the feedback transistor 300 and remaining in the FD region at time t45 is $1/\sqrt{(1+A\times Cc/(Cc+Cfd))}\times Cc/(Cfd+Cc)\times\sqrt{(Cfd/Cs)}$ times the thermal noise remaining in the FD region at time t42.

42nd Period

At time t46, the switching circuits 23 and 90 are controlled. More specifically, the switch element 230 is controlled to be on, and the switch element 231 is controlled to be off. As a result, the source or drain of the amplifier transistor 200 is connected to the voltage supply 232, and its potential becomes VB51. In addition, the switch element 902 is controlled to be on, and the switch elements 900 and 901 are controlled to be off. As a result, the current supply 905 is connected to the signal readout line 7. By controlling the switching circuits 23 and 90 in this way, the amplifier circuit 20C operates as a source follower circuit.

At time t46, the voltage of the FD region has changed from the reset voltage by a voltage corresponding to the amount of signal charge generated by the photoelectric converter 1 during the period from time t45 to t46.

Subsequently, at time t47, a potential corresponding to the potential of the FD region is applied to the signal readout line 7. As described above, the amplification factor of the source follower circuit is about 1. For this reason, the signal voltage of the FD region is output to the signal readout line 7 with an amplification factor of about 1.

In the specific example according to the fifth embodiment, the direction of the current flowing through the amplifier transistor 200 is always the same from "40th Period" to "42nd Period". Thus, the influence of the output variation caused by the asymmetry of the drain/source of the transistor can be reduced. This is advantageous from a viewpoint of obtaining excellent image data having stably suppressed random noise.

Camera System

Figure 15:
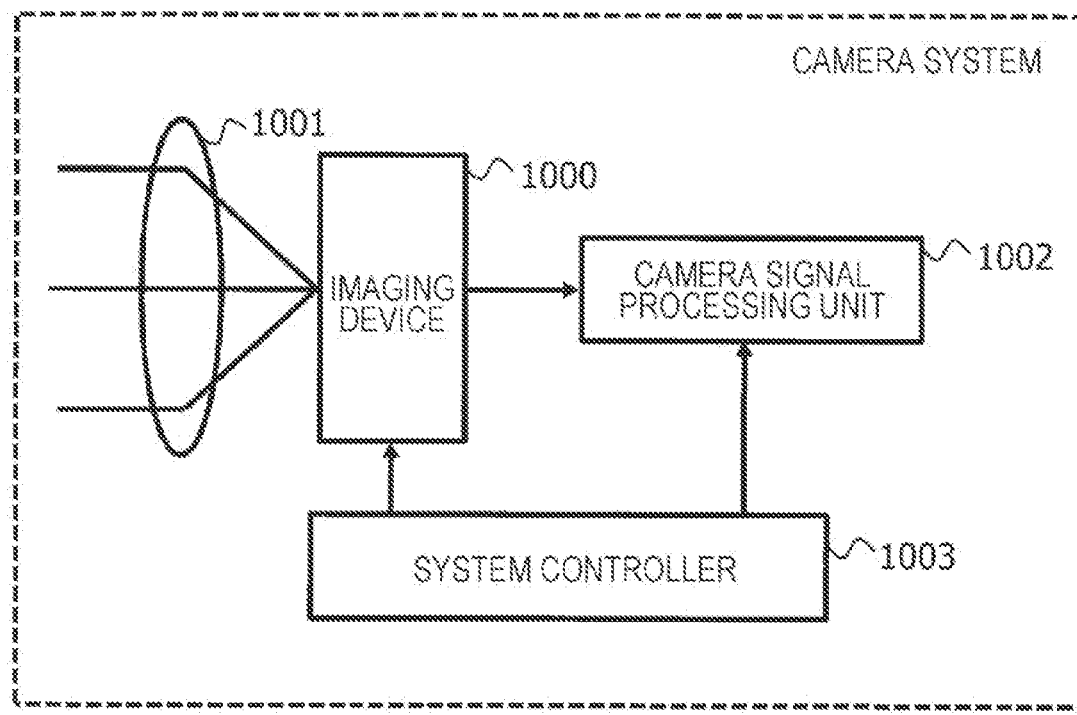
FIG. 15 is a schematic illustration of an exemplary circuit configuration of a camera system.

FIG. 15 illustrates an example of the configuration of a camera system provided with an imaging device. The camera system includes an imaging device 1000, an optical system 1001, a camera signal processing unit 1002, and a system controller 1003.

As the imaging device 1000, the imaging device described in each of the first to fifth embodiments can be used. The optical system 1001 collects light. The optical system 1001 includes a lens and the like. The camera signal processing unit 1002 performs signal processing on data of an image captured by the imaging device 1000 and outputs the processed data as an image or data. The system controller 1003 controls the imaging device 1000, the camera signal processing unit 1002, and the like.

By using the imaging device described in one of the first to fifth embodiments as the imaging device 1000, reset noise (KTC noise) generated in a readout operation can be appropriately suppressed. This allows for accurate charge readout, resulting in a camera system with excellent image characteristics.

The imaging device according to the present disclosure can be used for various camera systems and sensor systems, such as a digital still camera, a medical camera, a monitoring camera, a vehicle-mounted camera, a digital single-lens reflex camera, and a digital mirrorless single-lens reflex camera.

What is claimed is:

1. An imaging device comprising:
a photoelectric converter that converts light into signal charge;
a charge accumulation region that accumulates the signal charge;
a first transistor having a gate connected to the charge accumulation region;
an amplifier circuit that is connected between the charge accumulation region and a source or a drain of the first transistor and that amplifies an output of the first transistor to output to the charge accumulation region; and
a first connection that connects the amplifier circuit to the charge accumulation region and extends entirely between the amplifier circuit and the charge accumulation region,
wherein the first connection includes no transistor.

2. The imaging device according to claim 1, wherein the amplifier circuit includes a common gate amplifier circuit.

3. The imaging device according to claim 2, wherein the common gate amplifier circuit has a voltage gain greater than 1 in a first period.

4. The imaging device according to claim 2, wherein the common gate amplifier circuit has a voltage gain greater than 1 in a first period and has a voltage gain greater than or equal to 0 and less than or equal to 1 in a second period.

5. The imaging device according to claim 1, wherein the amplifier circuit has a voltage gain greater than 1 in a first period.

6. The imaging device according to claim 1, wherein the amplifier circuit has a voltage gain greater than 1 in a first period and has a voltage gain greater than or equal to 0 and less than or equal to 1 in a second period.

7. The imaging device according to claim 1, wherein the amplifier circuit includes only one transistor between the source or the drain of the first transistor and the first connection.

8. The imaging device according to claim 1, further comprising a second transistor having a source and a drain, one of the source and the drain of the second transistor being connected to one of the source and the drain of the first transistor, the second transistor being configured to cause the first transistor to selectively output a signal,
wherein the amplifier circuit does not include the second transistor.

9. The imaging device according to claim 1, wherein the first connection includes a capacitor.

10. The imaging device according to claim 1, further comprising a second connection that connects the amplifier circuit to the charge accumulation region and extends entirely between the amplifier circuit and the charge accumulation region,
wherein the second connection includes a transistor.

11. An imaging device comprising:
a photoelectric converter that converts light into signal charge;
a charge accumulation region that accumulates the signal charge;
a first transistor having a gate connected to the charge accumulation region;
an amplifier circuit that is connected between the charge accumulation region and a source or a drain of the first transistor and that amplifies an output of the first transistor to output to the charge accumulation region;
a first current supply configured to be connected to one of the source or drain of the first transistor; and
a second current supply configured to be connected to another of the source and drain of the first transistor,
wherein one of the first current supply and the second current supply is electrically connected to the first transistor, and
wherein a direction of a current flowing in the first transistor when the first current supply is electrically connected to the first transistor is a same as a direction of a current flowing in the first transistor when the second current supply is electrically connected to the first transistor.

12. An imaging device comprising:
a photoelectric converter that converts light into signal charge;
a charge accumulation region that accumulates the signal charge;
a first transistor having a first source, a first drain, and a first gate, the first gate being connected to the charge accumulation region;
a second transistor having a second source and a second drain, one of the second source and the second drain being connected to one of the first source and the first drain, the second transistor being configured to cause the first transistor to selectively output a signal; and
an amplifier circuit that is connected between the charge accumulation region and the one of the first source and the first drain and that amplifies the signal of the first transistor to output to the charge accumulation region,
wherein the amplifier circuit does not include the second transistor.

13. The imaging device according to claim 12, wherein the amplifier circuit includes a common gate amplifier circuit.

14. The imaging device according to claim 13, wherein the common gate amplifier circuit has a voltage gain greater than 1 in a first period.

15. The imaging device according to claim 13, wherein the common gate amplifier circuit has a voltage gain greater than 1 in a first period and has a voltage gain greater than or equal to 0 and less than or equal to 1 in a second period.

16. The imaging device according to claim 12, wherein the amplifier circuit has a voltage gain greater than 1 in a first period.

17. The imaging device according to claim 12, wherein the amplifier circuit has a voltage gain greater than 1 in a first period and has a voltage gain greater than or equal to 0 and less than or equal to 1 in a second period.

18. The imaging device according to claim 12, further comprising a first connection that connects the amplifier circuit to the charge accumulation region and extends entirely between the amplifier circuit and the charge accumulation region,
wherein the first connection includes no transistor, and
wherein the first connection includes a capacitor.

19. The imaging device according to claim 12, further comprising:
a first connection connects the amplifier circuit to the charge accumulation region and extends entirely between the amplifier circuit and the charge accumulation region, wherein the first connection includes no transistor; and
a second connection that connects the amplifier circuit to the charge accumulation region and extends entirely between the amplifier circuit and the charge accumulation region, wherein the second connection includes a transistor.

20. The imaging device according to claim 12, further comprising:
an AD converter; and
a signal line connected between the first transistor and the AD converter,
wherein the second transistor is configured to cause the first transistor to selectively output the signal to the signal line.

* * * * *